United States Patent [19]
Orlamünder et al.

[11] Patent Number: 6,053,295
[45] Date of Patent: Apr. 25, 2000

[54] TORSIONAL VIBRATION DAMPER

[75] Inventors: Andreas Orlamünder, Schweinfurt; Reinhard Feldhaus, Ebenhausen, both of Germany

[73] Assignee: Mannesmann Sachs AG, Schweinfurt, Germany

[21] Appl. No.: 09/049,335

[22] Filed: Mar. 27, 1998

[30] Foreign Application Priority Data

Mar. 27, 1997 [DE] Germany ............... 197 13 132

[51] Int. Cl.$^7$ .................. F16D 3/10; F16F 15/131
[52] U.S. Cl. ............ 192/55.3; 192/70.17; 192/200; 74/574; 464/137
[58] Field of Search ................ 192/55.2, 55.3, 192/55.61, 70.17, 200, 201, 204, 209, 212; 74/572, 574; 464/66, 68, 137

[56] References Cited

U.S. PATENT DOCUMENTS

| | | |
|---|---|---|
| 5,016,744 | 5/1991 | Fischer et al. . |
| 5,493,936 | 2/1996 | Stockman et al. . |
| 5,836,217 | 11/1998 | Sudau .......................... 74/574 |
| 5,878,856 | 3/1999 | Sudau et al. ................. 192/70.17 |

FOREIGN PATENT DOCUMENTS

| | | |
|---|---|---|
| 049 805 | 4/1982 | European Pat. Off. . |
| 2 254 906 | 10/1992 | United Kingdom . |
| 2 273 758 | 6/1994 | United Kingdom . |
| 2 282 868 | 4/1995 | United Kingdom . |
| 2 284 038 | 5/1995 | United Kingdom . |
| 2 306 620 | 5/1997 | United Kingdom . |
| 2 310 910 | 9/1997 | United Kingdom . |
| WO 89/01097 | 2/1989 | WIPO . |
| WO 94/10477 | 5/1994 | WIPO . |
| WO 96/29525 | 9/1996 | WIPO . |

*Primary Examiner*—Richard M. Lorence
*Attorney, Agent, or Firm*—Cohen, Pontani, Lieberman & Pavane

[57] ABSTRACT

A torsional vibration damper having an input part, an output part, and a plurality of coupling members coupling the input part with the output part. The input part and the output part are tiltable relative to one another so that when a wobbling movement of at least one of the parts occurs, this wobbling movement is not compulsorily or positively transmitted to the other part.

43 Claims, 10 Drawing Sheets

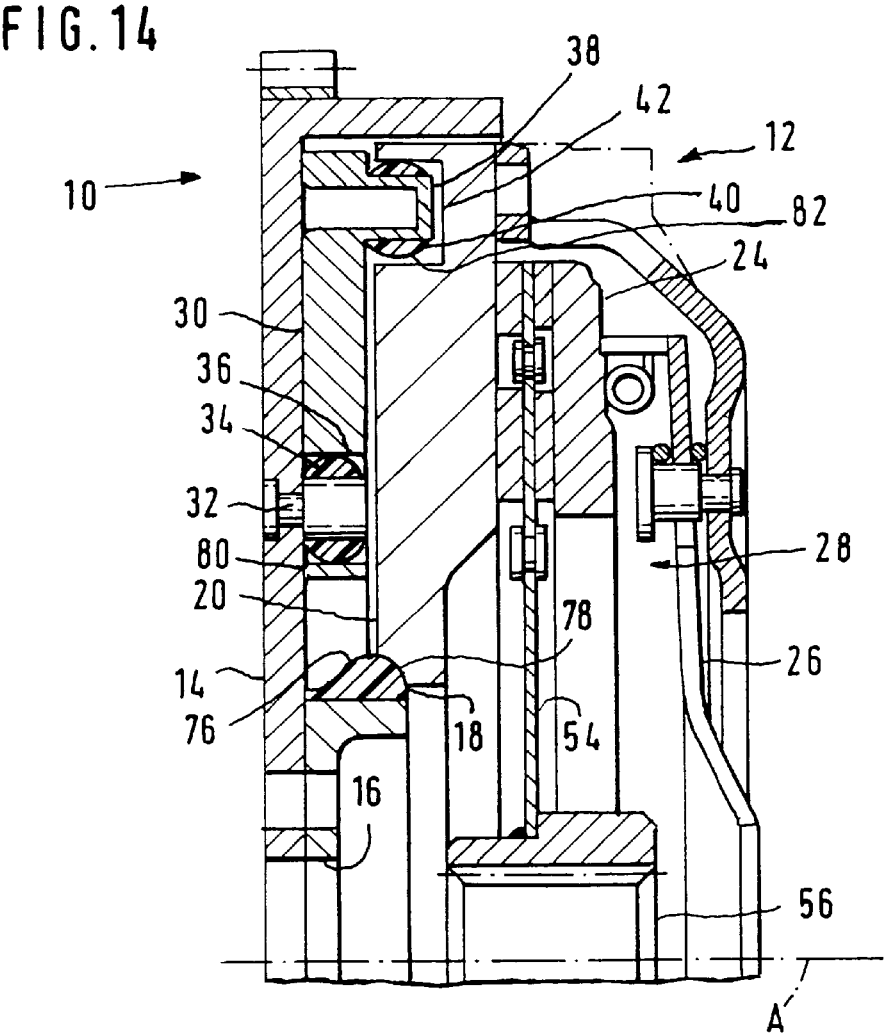

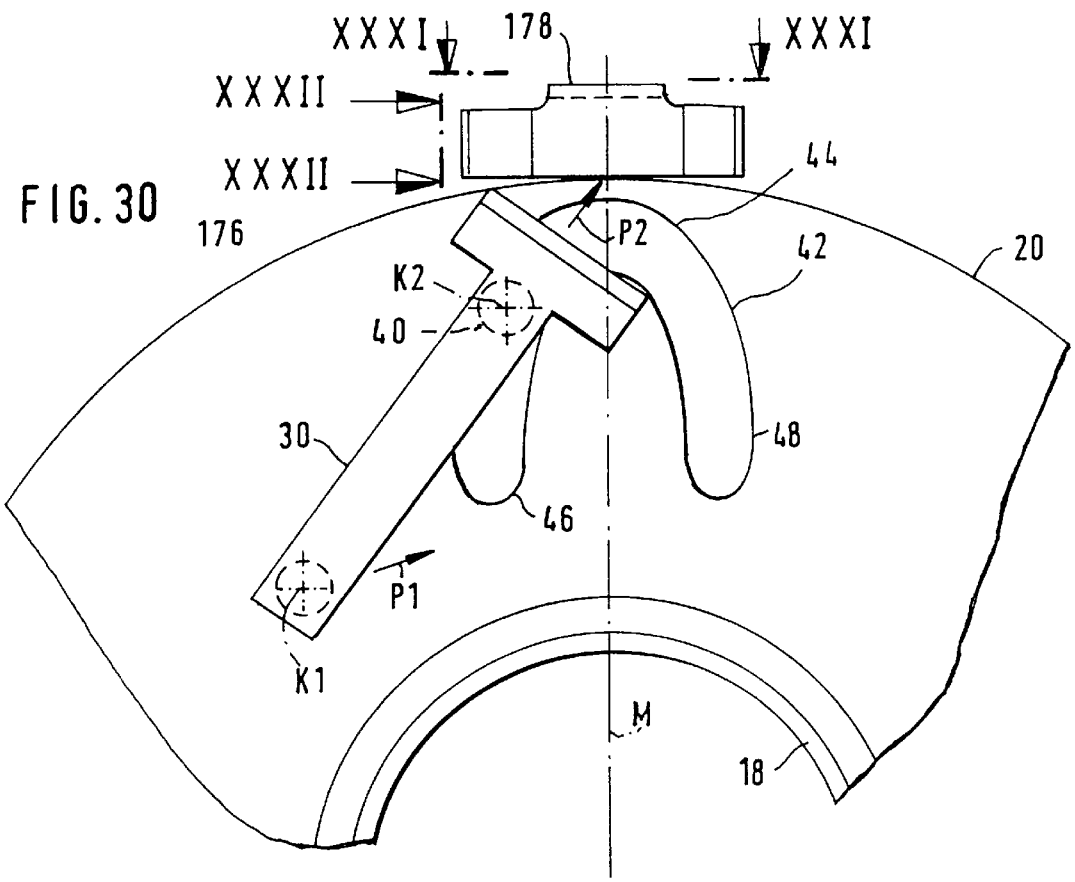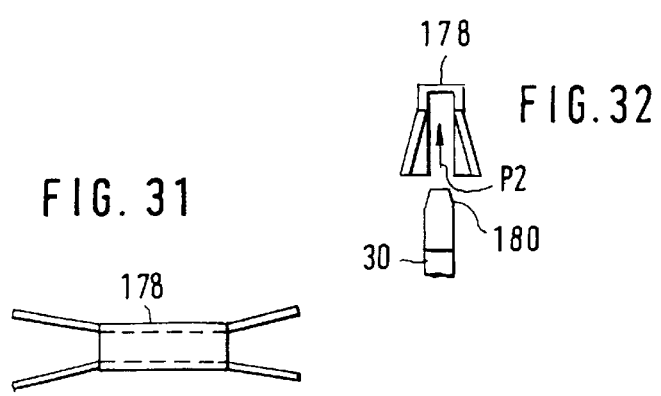

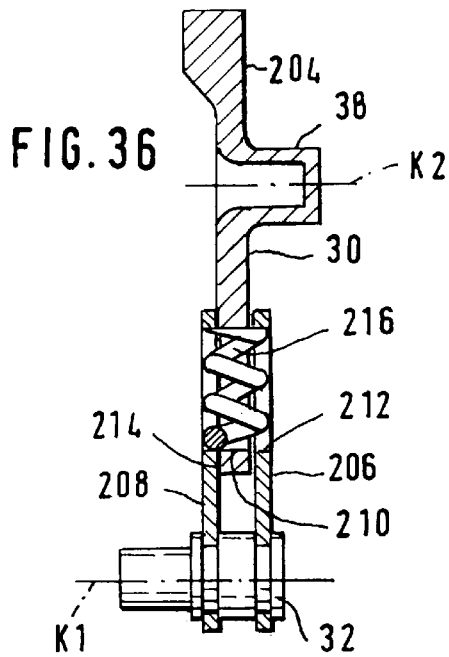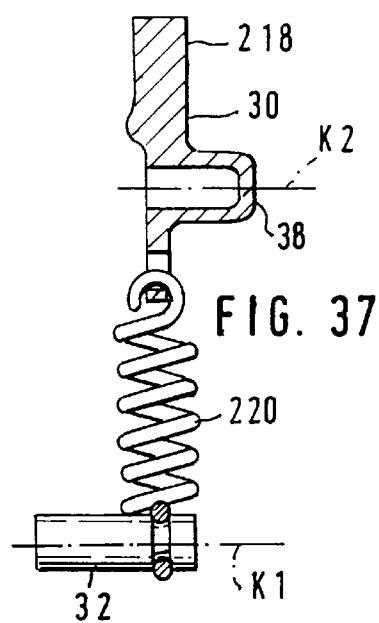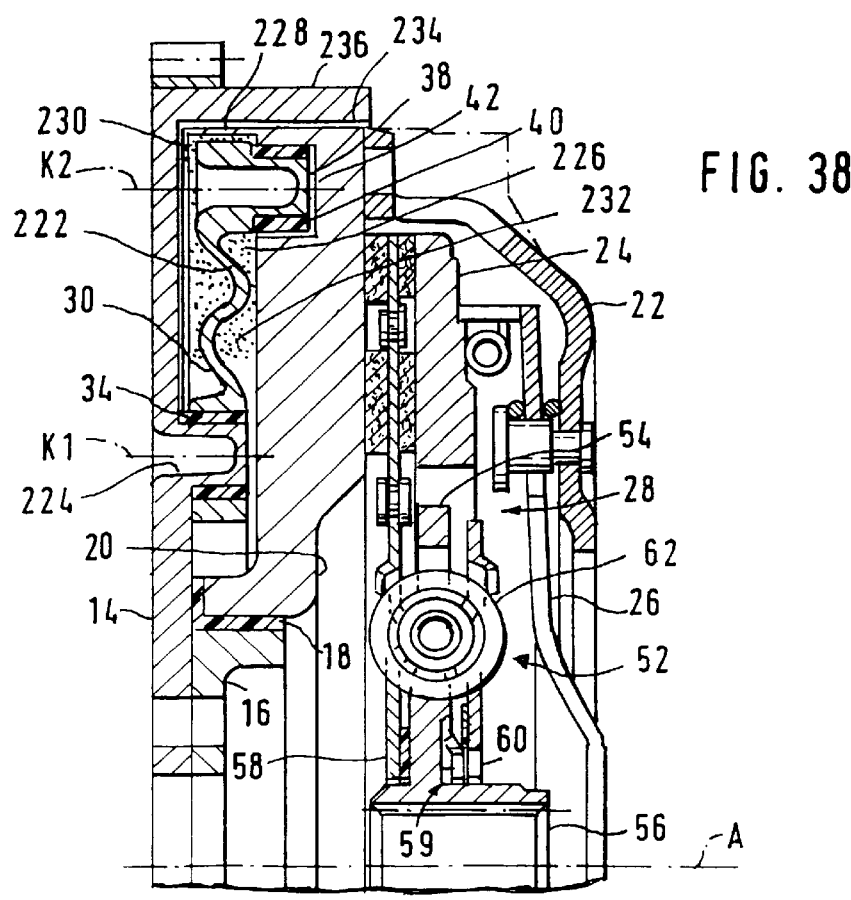

TORSIONAL VIBRATION DAMPER

BACKGROUND OF THE INVENTION

1. Field of the Invention

The present invention is directed to a torsional vibration damper comprising a first damper mass part, a second damper mass part which are rotatable about an axis of rotation, and at least one coupling/damping device by means of which the first damper mass part and the second damper mass part are coupled for torque transmission. The at least one coupling/damping device allows a relative rotation of the first damper mass part and the second damper mass part relative to one another about the axis of rotation. The at least one coupling/damping device acts on the first damper mass part at one of its end regions at a first coupling region and acts on the second damper mass part at its other end region at a second coupling region for transmitting torque between the first damper mass part and the second damper mass part.

2. Discussion of the Prior Art

WO94/10477 discloses a torsional vibration damper of the type mentioned above in the form of a two-mass flywheel for a motor vehicle clutch. This torsional vibration damper has an input part which is coupled with a crankshaft of an internal combustion engine, an output part which is mounted so as to be rotatable by means of a ball bearing at the input part, and a plurality of coupling/damping devices coupling the input part and the output part with one another for common rotation and for transmission of torque. Each coupling/damping device comprises a first coupling member which is mounted in a radial inner region at the output part so as to be swivelable about a coupling axis extending substantially parallel to the axis of rotation of the crankshaft. A second coupling member is connected with the first coupling member at a radial outer portion of the first coupling member so as to be swivelable about a coupling axis extending substantially parallel to the axis of rotation, wherein the radial outer portion of the first coupling member is widened in the circumferential direction. The second coupling member extends approximately in the circumferential direction and is connected at its other end with the input part so as to be swivelable about a coupling axis extending substantially parallel to the axis of rotation of the crankshaft. During a rotation of this known torsional vibration damper, the centrifugal force that is directed outward with respect to the axis of rotation acts on the first coupling member, especially on its widened radial outer region, and tends to orient the first coupling member in a radial outward direction with respect to its articulation point at the output part. When a rotational force is transmitted by this known coupling device, i.e., when a torque is generated between the input part and the output part, the first coupling member is deflected from its radial outwardly oriented rest position by the second coupling part connected with the input part. The extent of deflection is determined, on the one hand, by the centrifugal force which depends on the rate of rotation or speed and, on the other hand, by the torque, i.e., load, to be transmitted between the input part and the output part. That is, with the load remaining equal, a state of equilibrium is introduced in which the first coupling member is deflected from its rest position. If torsional vibrations occur in the drivetrain, this causes the first coupling member of every coupling/damping device to be excited to swivel about its deflection position due to the load alternation vibrations in the torsional vibration damper and accordingly to act as an energy accumulator corresponding to a spring or the like.

In general, the problem in torsional vibration dampers of the type mentioned above is that the component, i.e., the input part, connected with the crankshaft does not rotate exactly in the respective plane associated therewith because bending deformations are generated in the crankshaft, especially by the piston of the internal combustion engine located closest to the input part. These bending deformations lead to a corresponding wobbling movement of the input part about the axis of rotation, accompanied by deflection of the input part out of the associated plane. Since the output part is coupled with the input part by the ball bearing mentioned above so as to be rotatable, but is substantially rigidly coupled therewith with respect to other movements, this wobbling is transmitted to the output part. However, since the output part generally forms a flywheel for a friction clutch in a motor vehicle and a clutch disk coupled with a transmission input shaft is pressed against the flywheel in the engaged state of the clutch, this wobbling can also be transmitted to the transmission input shaft. This can lead to the generation of unwanted vibrations in the drivetrain and can also disadvantageously impair the operability of the entire drivetrain. The bearing support region of the output part at the input part, i.e., the ball bearing, is also stressed to an excessive degree by the enforced wobbling which can lead to damage in this region.

SUMMARY OF THE INVENTION

Accordingly, it is an object of the present invention to provide a torsional vibration damper in which, even during the occurrence of forced or constrained wobbling movements of one of the damper mass parts, the torsional vibration damper can maintain an operation which is substantially unimpaired by these wobbling movements.

Pursuant to this object and others which will become apparent hereafter, one aspect of the present invention resides in a torsional vibration damper having a first damper mass part and a second damper mass part which are rotatable about an axis of rotation. The damper mass parts, at least in one or more areas, lie in planes which are preferably substantially orthogonal to the axis of rotation. At least one coupling/damping device couples the first damper mass part and the second damper mass part are coupled for torque transmission. The at least one coupling/damping device allows a relative rotation of the first damper mass part and the second damper mass part relative to one another about the axis of rotation. The at least one coupling/damping device acts on the first damper mass part at one of its end regions at a first coupling region and acts on the second damper mass part at its other end region at a second coupling region for transmission of torque between the first damper mass part and the second damper mass part.

In another embodiment of the torsional vibration damper according to the invention the damper mass parts are tiltable relative to one another at least in one area. Therefore, since it is possible in the torsional vibration damper according to the invention for the two damper mass parts to tilt relative to one another, when a wobbling movement is forced upon one of the damper mass parts, only that damper mass part is tilted with respect to the axis of rotation because it is tiltable relative to the other damper mass part, and the forced tilting movement is accordingly not transmitted to the other damper mass part. As a result, such wobbling movements in the torsional vibration damper according to the invention are substantially intercepted and not transmitted to other components, for example, components of the drivetrain, a clutch, a transmission or the like.

For this purpose, an arrangement of the type mentioned above can be provided, for example, in which one of the damper mass parts is rotatably supported at the other respective damper mass part and/or a structural component part that is substantially fixedly with the other damper mass part and in which a relative tilting of the first damper mass part and the second damper mass part relative to one another is made possible in the region of the rotatable bearing.

A substantially free tilting capability of the two damper mass parts relative to one another can be provided in that the first damper mass part and the second damper mass part are supported so as to be articulated at one another by a ball-and-socket type joint. To accomplish this, a ball portion of the ball-and-socket joint is provided at one of the damper mass parts and a socket portion is provided at the other damper mass part.

The capability of the two damper mass parts to tilt with respect to one another can be provided by a corresponding configuration of the sliding bearing, of the at least one rolling element bearing or the like. For example, the sliding bearing material can be elastically deformable.

Further, it is possible for the rolling element bearing to comprise at least one bearing which allows tilting, for example, a spherical roller bearing or self-aligning ball bearing, a grooved ball bearing or a grooved rolling element bearing with extensive play, or the like.

To enable the tilting of the two damper mass parts with respect to one another, an arrangement of the type mentioned above can also be provided in which at least one of the damper mass parts and/or a structural component part which is substantially fixed therewith is elastically deformable in the region of the rotatable bearing support. That is, at least one of the damper mass parts can have a bending region in which the tilting capability is enabled. A special configuration of the bearing area need not be taken into consideration in this case, i.e., a support by means of a ball bearing or the like which is relatively rigid with respect to tilting is then possible.

In the torsional vibration damper known from WO94/10477, the damping function and the coupling function are provided by the first and second coupling members mentioned in the beginning. Each of these coupling members is rotatably connected, in the region of one of its ends, with the input part or the output part by corresponding pins. However, since another kind of movement of the individual coupling members with respect to the input part and the output part is not possible, a coupling is also produced between the input part and the output part which is relatively rigid with respect to a wobbling movement.

Therefore, in accordance with another embodiment of the present invention, the torsional vibration damper comprises a first damper mass part and a second damper mass part which are rotatable about an axis of rotation, and at least one coupling/damping device which couples the first damper mass part and the second damper mass part so that the first damper mass part and the second damper mass part can rotate relative to one another about the axis of rotation. The at least one coupling/damping device acts on the first damper mass part at one of its end regions at a first coupling region and acts on the second damper mass part at its other end region at a second coupling region for torque transmission between the first damper mass part and the second damper mass part. The at least one coupling/damping device is coupled in its end regions with the respective damper mass part so as to be rotatable about respective coupling axes which preferably extend parallel to the axis of rotation.

According to the present invention, the at least one coupling/damping device and/or at least the coupling region are/is constructed in such a way that a tilting of the first damper mass part and the second damper mass part relative to one another is essentially not impeded. For example, the connection of the at least one coupling/damping device with at least one of the damper mass parts is constructed so that the at least one coupling device is tiltable in at least one of the end regions with respect to the associated damper mass part and the coupling axis. For this purpose, a pin-shaped projection is provided which extends substantially parallel to the respective coupling axis in the at least one end region of the at least one coupling/damping device or in the associated coupling region. The pin-shaped projection engages in a recess of the other respective element of the coupling/damping device and coupling region so that tilting is made possible.

When a bearing device acting between the pin-shaped projection and the recess is provided, it can be constructed so that it comprises two portions which are displaceable relative to one another to enable tilting. For example, the bearing device can be elastically deformable in at least some areas.

In a particularly simple and economical embodiment, the bearing device can comprise a sliding bearing device.

However, alternatively, it is also possible for the bearing device to comprise a spherical roller bearing or self-aligning ball bearing, a grooved ball bearing or grooved rolling element bearing with extensive play, or the like.

Further, in order to enable tilting, in another embodiment of the invention the pin-shaped projection and the recess are connected with one another in the manner of a ball-and-socket joint. The ball portion of the joint is formed at the pin-shaped projection, and a counterbearing portion of the recess being mounted on this ball portion.

It is also possible in a construction of this type for the ball portion and/or the counterbearing portion to comprise a sliding bearing material portion. To accomplish this, the ball portion can comprise a convexly curved surface portion of the pin-shaped projection and/or of the sliding bearing material portion.

In a further embodiment which allows for the tilting capability of the two damper mass parts relative to one another, the at least one coupling/damping device is bendable, preferably elastically deformable, in the direction of the axis of rotation at least in a region situated between its end regions essentially orthogonal to a connecting line connecting the end regions.

In still another embodiment at least the part of the pin engaging in the recess and/or the recess in the region of at least one part of the wall portion of the same which cooperates with the pin are/is elastically deformable. In an embodiment of this kind, a deformation in the pin and/or in the region of the recess is brought about when the at least one coupling/damping device is tilted with respect to one of the damper mass parts.

Moreover, it is also possible that the pin has a predetermined amount of play in the recess by its portion engaging in the recess.

Since coupling/damping devices of this kind are generally exposed during operation to centrifugal force acting in the radial outward direction, a movement play of a pin in the recess also does not lead to an unstable state or to the generation of clattering or rattling noises.

In the torsional vibration damper known from WO94/10477 in which the damping function is brought about by the deflection of the first coupling member out of its basic position against the action of centrifugal force, the damping function is highly dependent upon the centrifugal force depending on the rate of rotation. That is, as the rate of rotation increases, the centrifugal force acting on the first damping part increases, and therefore the force necessary to deflect the first damping member by a predetermined amount accordingly also increases. As a result, a virtually rigid coupling is generated between the input part and the output part of the torsional vibration damper at very high rates of rotation, and torsional vibrations or alternating load vibrations which occur at higher rates of rotation and which oscillate around the load moment transmitted at this rate of rotation can no longer be damped in a suitable manner.

In the known torsional vibration damper, there is the additional problem that an increasing stiffness of these coupling/damping devices occurs due to the internal friction of the bearing portions connecting the different coupling members with one another or the internal friction of the bearing portions coupling the coupling members to the input part or the output part, which internal friction increases with the rate of rotation.

Therefore, in accordance with another aspect, the present invention provides a torsional vibration damper which comprises a first damper mass part and a second damper mass part which are rotatable about an axis of rotation, and at least one coupling/damping device by means of which the first damper mass part and the second damper mass part are coupled for the transmission of torque. The at least one coupling/damping device allows a relative rotation of the first damper mass part and the second damper mass part relative to one another about the axis of rotation. The at least one coupling/damping device acts on the first damper mass part at one of its end regions at a first coupling region and acts on the second damper mass part at its other end region at a second coupling region for torque transmission between the first damper mass part and the second damper mass part, wherein the at least one coupling/damping device is coupled in its end regions with the respective damper mass part so as to be rotatable about respective coupling axes which preferably extend parallel to the axis of rotation.

According to the present invention, a vibration damping arrangement in which vibrations are damped by elastic deformation of at least one damping component is associated with the torsional vibration damper. Since the elastic deformation of damping components is generally independent from the rate of rotation and is based substantially on material characteristics of the elastically deformable damping component, the introduction of an elastically deformable damping component results in that torsional vibrations generated in the drivetrain can be damped even at relatively high rates of rotation and independent from these rates of rotation.

For example, for this purpose the at least one coupling/damping device is elastically deformable in the direction of a connecting line connecting the two end regions.

In order that the at least one coupling/damping device is elastically deformable, it comprises at least one damping element, preferably a helical tension spring, helical compression spring, elastically deformable plastic part or the like, for example in an intermediate portion situated between the end regions.

Also, in a construction of this kind a pin-shaped projection can be provided at the coupling/damping device in at least one end region or at the associated coupling region and a recess can be provided at the other respective element of the coupling/damping device and coupling region, wherein the pin-shaped projection engages in the recess for coupling. In such a construction of the coupling, an elastically deformable component can be introduced in that the pin-shaped projection and/or recess in the region of its wall portion cooperating with the pin-shaped projection is elastically deformable at least in one or more areas.

Alternatively or in addition, a bearing arrangement can be provided which acts between the pin-shaped projection and the recess and which is elastically deformable at least in one or more areas.

Further, it is possible that at least one spring torsional vibration damper is associated with the torsional vibration damper. This spring torsional vibration damper comprises a first spring torsional vibration damper mass part, a second spring torsional vibration damper mass part, and at least one damping spring unit acting between the first spring torsional vibration damper mass part and the second spring torsional vibration damper mass part.

For this purpose, the spring torsional vibration damper can be formed by a clutch disk of a motor vehicle friction clutch, for example. However, it is noted in this connection that the spring torsional vibration damper can be introduced at any other location in the drivetrain as a separate structural component part. In another conceivable construction in this respect, at least one damper mass part of the torsional vibration damper according to the invention is divided into two components and the at least one damping spring unit can be allowed to act between these two components, each of which then forms a spring torsional vibration damper mass part.

In order to further damp the torsional vibrations occurring during operation or to dissipate the vibration energy contained in these vibrations, it is further suggested that a friction force generation device is provided which, when relative rotation occurs between the first damper mass part and the second damper mass part, generates a friction force that is preferably dependent on the extent of the relative rotation.

In order to prevent the generation of shocks in the torsional vibration damper, especially during vibrations occurring in a load alternation range, i.e., during transition from push operation to pull operation, it is suggested that the friction force generated by the friction force generation device adopts a maximum value in the region of a basic rotation position which is a relative rotational position between the first damper mass part and second damper mass part in which no torque is transmitted between the latter.

The friction force generation device can be constructed so that, for example, a friction surface part with a coefficient of friction which changes in one friction direction is provided at one of the damper mass parts and that a counter-friction surface part is provided at the other damper mass part, wherein this counter-friction surface part is displaced in the friction direction over the friction surface part when relative rotation occurs between the two damper mass parts.

As an alternative or in addition to this, it is possible for the at least one coupling/damping device to have a friction part and to provide a counter-friction part at one of the damper mass parts, wherein the friction part is displaced along this counter-friction part at the coupling/damping device when a relative rotation occurs for generating the friction force.

Furthermore, in order to dissipate vibration energy contained in the torsional vibrations, the at least one coupling/damping device is arranged in a space which is tight against fluid at least radially outward with respect to the axis of rotation, and a lubricating/damping fluid which surrounds the at least one coupling/damping device at least in one or more areas is arranged in the space. Since this fluid serves to lubricate in addition to its damping function, various components of the coupling/damping device or of the input part and the output part are additionally protected against excessive wear.

The coupling/damping device can be constructed, for example, so that it is rotatably arranged by one of its end regions at one of the damper mass parts and has, in its other end region, a pin-shaped projection which engages in an elongated recess formed in the other damper mass part. Thus, in a construction of this kind, a stationary connection of the at least one coupling/damping device with the associated coupling region of one of the damper mass parts is provided only in one of the end regions, wherein the at least one coupling/damping device is swivelable about the respective coupling axis in this region. In the other region, in which the coupling/damping device engages in the elongated recess, a connection that is swivelable about a respective coupling axis is likewise formed between the coupling/damping device and the respective coupling region, namely the elongated recess in which there is produced a relative rotation around a coupling axis when the damper parts rotate relative to one another. In the region of this coupling connection, the coupling axis is also displaceable in a longitudinal direction of the elongated recess, so that a coupling that is positioned in conformity with the load state and the rate of rotation is provided in this case rather than a stationary coupling connection.

For this purpose, the construction can be configured so that the elongated recess is substantially U-shaped or V-shaped, wherein a vertex region of the U-shape or V-shape lies radially outside of the free ends of the sides or legs of the U-shape or V-shape.

Further, it is possible that in the basic rotational position the region of the rotatable support of one end region of the coupling/damping device at one damper mass part lies substantially radially between the vertex region of the U-shaped or V-shaped recess and the axis of rotation.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 14 shows a sectional view corresponding to FIG. 1 which shows a special construction of the bearing connection between the input part and the output part and between the input part or output part with a coupling member;

FIGS. 15 to 17 show modes of construction of connection bearings for the coupling member;

FIG. 30 shows a view corresponding to FIG. 18 with a coupling member and a friction force generation device associated with the coupling member;

FIG. 31 shows a view of the friction force generation device considered in the direction indicated by arrow XXXI in FIG. 30;

FIG. 32 shows a side view of the friction force generation device considered in the direction indicated by arrow XXXII in FIG. 30;

FIGS. 36 and 37 show construction forms of a coupling member which is elastic in the longitudinal direction; and FIG. 38 shows a sectional view corresponding to FIG. 1 in which the coupling member is elastic in the longitudinal direction and is guided in a damping/lubricating fluid.

DETAILED DESCRIPTION OF THE PREFERRED EMBODIMENTS

Figure 1:
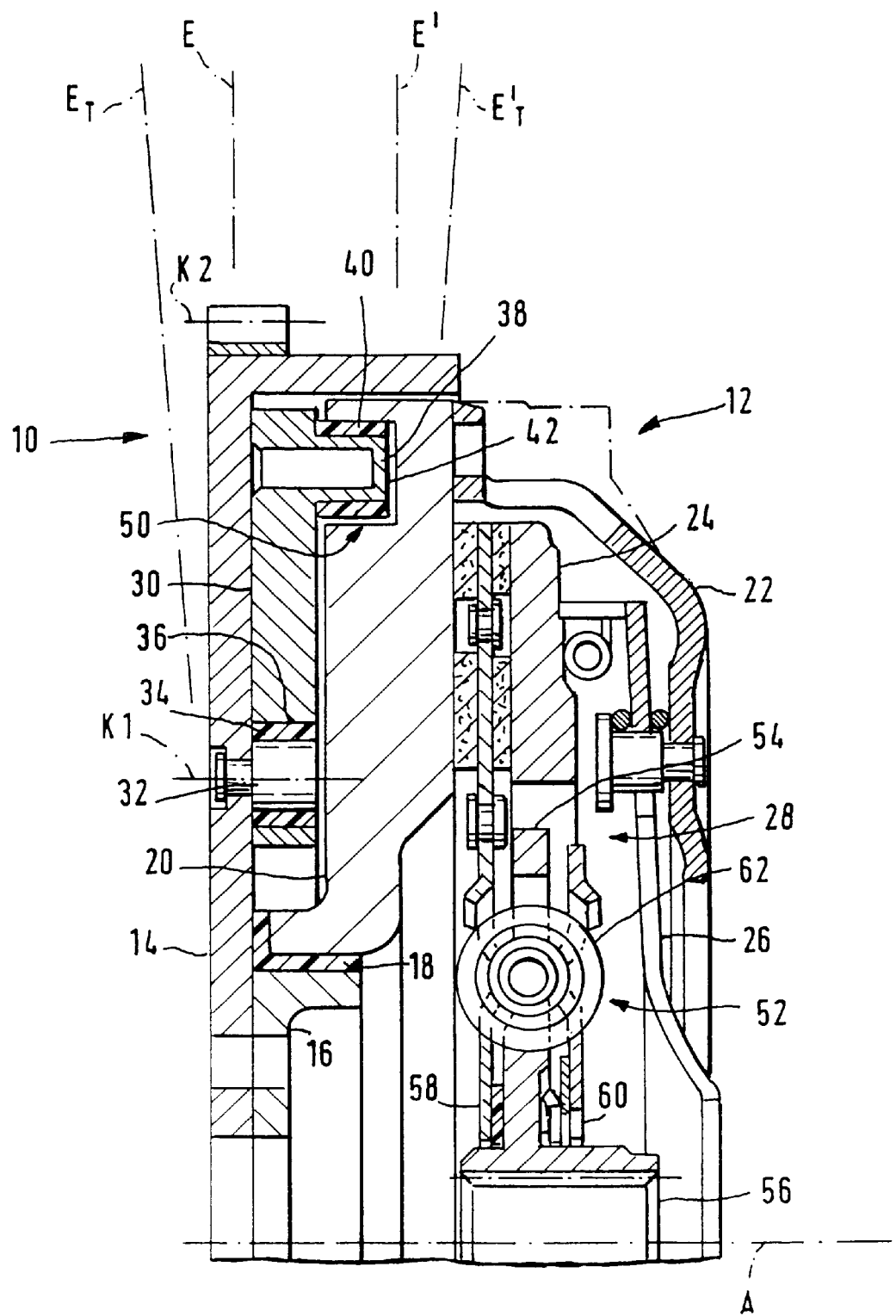
FIG. 1 shows a partial longitudinal sectional view of a torsional vibration damper according to the invention which forms a flywheel of a motor vehicle friction clutch.

FIG. 1 shows a torsional vibration damper 10, according to the invention, which is shown in connection with a motor vehicle friction clutch, designated in general by 12. The torsional vibration damper 10 comprises an input part 14 which is fixedly connected with a crankshaft, not shown in the drawing, of an internal combustion engine by screw bolts or the like and is accordingly rotatable about an axis of rotation A along with the crankshaft. Further, a bearing angle part 16 is fixedly mounted along with the input part 14 at the crankshaft. An output part 20 of the torsional vibration damper 10 is mounted on the bearing angle part 16 via a sliding bearing part 18. That is, the output part 20 is rotatable with respect to the input part 14 by means of the sliding bearing part 18.

A clutch housing is fixedly connected in a radial outer region with the output part 20 in a manner known per se. Inside the clutch housing 22, a pressure plate 24 is pressed against a clutch disk 28, i.e., the friction facing of the clutch disk, under pretensioning by a diaphragm spring 26, so that the clutch disk 28 is clamped along its friction facing between the pressure plate 24 and the output part 20 of the torsional vibration damper 10. Since the detailed construction of a motor vehicle friction clutch has only partial significance for the subject matter of the present invention, the various components of the motor vehicle friction clutch are only described insofar as required for understanding the operation of the present invention.

The input part 14 and the output part 20 of the torsional vibration damper 10 are coupled via a plurality of coupling members 30 arranged so as to be distributed in the circumferential direction for common rotation about the axis of rotation A, wherein, however, as will be described hereinafter, a relative rotation between the input part 14 and the output part 20 is possible.

Every coupling member 30 is arranged in a radial inner region at the input part 14 so as to be swivelable about a coupling axis K1. The coupling axis K1 extends substantially parallel to the axis of rotation A. In this region, a pin 32 is fixed to the input part 14, for example, by means of rivets, screws, welds or the like. The pin 32 is surrounded by a sliding bearing sleeve 34 which is received in a corresponding recess 36 in the coupling member. Due to the sliding bearing sleeve 34, the coupling member 30 is substantially freely rotatable on the pin 32, i.e., without substantial friction forces. A pin-shaped projection 38 is formed in an outer region, for example, by deep drawing, stamping or the like. This pin-shaped projection 38 is likewise enclosed by a sliding bearing sleeve 40. The projection 38 engages with the sliding bearing sleeve 40 enclosing it in a recess 42 in the output part 20. As will be described hereinafter, for example, with reference to FIG. 18, the recess 42 is U-shaped or V-shaped. Together with the sliding bearing sleeve 40, the projection 48 engaging in the recess 42 forms an articulation of the coupling member 30 at the output part 20 so as to allow rotation about a coupling axis K2. However, as will be described hereinafter, the region of this articulation, i.e., the coupling axis K2, is displaceable in the longitudinal direction of the recess 42.

As a result of the rotation of the crankshaft which is fixedly connected with the input part, there is a corresponding rotation of the input part 14 and of the output part 20 which is carried along by the coupling members 30. However, because of the rotational force, the radial outer part of the coupling members 30, i.e., the area of the coupling members 30 coupled with the output part 20, is pulled outward with respect to the axis of rotation A due to centrifugal force. As a result, the projection 38 is positioned in the area of the vertex 44 of the recess 42 when there is no load to be transmitted between the input part 14 and the output part 20. If a driving load is to be transmitted over the torsional vibration damper, this leads to a deflection of the projection 38 from the area of the vertex 44 into one of the leg areas 46, 48 of the U-shape, depending on the direction of the transmission of torque.

As will be seen in FIG. 1, the input part 14 and the output part 20 are arranged in planes E and E', respectively, which are approximately orthogonal to the axis of rotation A. When it is said that the input part 14 and the output part 20 are arranged in the respective planes, this is understood within the present application to mean that the corresponding parts extend along these planes E and E' at least in one or more areas. It would also be possible in principle that at least the input part does not extend along a straight plane, for example, plane E, by its main portion, but rather is curved, especially curved away from the output part 20. In such a case, the plane E would be defined by a correspondingly curved surface area segment.

During the operation of an internal combustion engine, bending vibrations of the crankshaft are generated, as a result of which the input part 14 of the torsional vibration damper 16, which input part 14 is rigidly coupled with the crankshaft, does not rotate exactly in the plane E, but rather is deflected, for example, in the direction of a plane $E_T$ and a wobbling movement is executed about the axis of rotation A. When referring to a deflection out of the plane E, this refers to the generation of a deflection out of a basic position in which such wobbling movements are not present. Accordingly, as was already mentioned, if, for example, the input part 14 is constructed in a curved manner, the deflection generated by the bending of the crankshaft leads to a deflection from the curved surface mentioned above which defines the basic position of the respective part.

In order to prevent the wobbling movement carried out through the input part 14 from being transmitted to the output part 20, the input part 14 and the output part 20 are coupled with one another so that the wobbling is decoupled. In this connection, it can be provided in the embodiment according to FIG. 1 that the material of the sliding bearing part 18 is elastically deformable so that when wobbling movements, e.g., of the input part 14, occur, the input part 14 can be tilted with respect to the output part 20 out of its plane E, for example, to the plane $E_T$. If a decoupling of this type is provided between the input part 14 and the output part 20, the output part 20 can remain positioned essentially in its plane E' even when the input part 14 executes a wobbling movement. As a result, the driving force can be transmitted to a transmission input shaft, not shown, without the introduction of any wobbling components via the clutch disk 28.

Further, in order to prevent any hindrance to this tilting of the input part 14 and the output part 20 with respect to one another, the coupling member 30 is constructed in such a way that it is tiltable at least in the region of the coupling with a part of the input part 14 and the output part 20 with respect to the respective coupling axis K1 or K2. In the embodiment according to FIG. 1, this is provided in that the projection 38 has a lateral play with its sliding bearing sleeve 40 in the recess 42 as is shown in FIG. 1 at 50. That is, if the input part 14 tilts, although it does carry along with it the coupling member 30 which is rotatably mounted thereon by the pin 32, the coupling member 30 has movement play with its projection 38 and the sliding bearing sleeve 40 in the recess 42 and accordingly does not lead to a rigid coupling between the input part 14 and the output part 20 hindering tilting.

Further, it is possible to construct the sliding bearing sleeve 34 and/or the sliding bearing sleeve 40 from elastically deformable material, which additionally contributes to a tilting capability of the coupling member 30 with respect to the respective coupling axis K1, K2.

As is further shown in FIG. 1, the clutch disk 28 has a spring torsional vibration damper 52 which is constructed in such a way that cover plates 58, 60 are provided on both sides of a central disk part 54 which is rigidly connected with a hub 56. The cover plates 58, 60 are rigidly connected with one another, and the cover plate 58 is further connected with the friction facings of the coupling. A plurality of spring windows which are aligned with one another in the axial direction is formed in each of the cover plates 58, 60 and in the central disk part 40 in a known manner, wherein at least one helical compression spring 62 or spring unit comprising a plurality of helical compression springs is arranged in the spring windows. In addition, it is possible to provide a plurality of spring units, possibly with different spring constants, in different radial regions in order to provide a staggered or graduated damping moment dependent on the load to be transmitted. The helical compression springs 62 contact the spring windows in control edges of the spring windows in the cover plates 58, 60 and the central disk part 54. The control edges adjoin the spring windows in the circumferential direction, and accordingly permit a relative rotation between the central disk part 54 and the cover plates 58, 60, wherein a relative rotation leads to a compression of the springs. Further, a friction force generation device 59, which is constructed in a generally known manner and acts between the central disk part 54 and the cover plates 58, 60, is provided in the spring torsional vibration damper 52.

The combination of a spring torsional vibration damper 52 of the type mentioned above with the torsional vibration damper 10 has the following advantage. Since the coupling stiffness of the torsional vibration damper 10 is dependent to a very great degree on the rate of rotation because of the centrifugal force acting on the coupling members 30, so that a substantially rigid coupling is generated at very high rates of rotation, the torsional vibration damper 10 could damp vibrations occurring at a high rate of rotation only to an insufficient degree or not at all. However, since the spring torsional vibration damper 52 is additionally provided in the clutch disk 28, an additional damping component, namely the springs 62 of the spring torsional vibration damper 52, is introduced which can provide a vibration damping function which is substantially independent from the rate of rotation.

Accordingly, torsional vibrations can also be prevented in the range of high rates of rotation.

The construction of the sliding bearing sleeves 34, 40 of elastically deformable material also contributes to a vibration damping of this kind that is independent from the rate of rotation because the torsional vibrations occurring in the range of higher rates of rotation as a result of such elastically deformable sliding bearing sleeves can be damped by the elastic deformation of the sliding bearing sleeves 34, 40.

With respect to the coupling of the coupling members 30 with the input part 14 and the output part 20 it will be noted that this coupling is not restricted to the embodiment shown in FIG. 1. For example, it is also possible to provide axial projections at both end regions of the coupling member 30 by deep drawing, stamping or the like, wherein a hole-shaped recess is to be provided in a corresponding manner at the input part 14 for receiving the radial inner projection. Since every coupling member 30 is supported between the input part 14 and the output part 20 such that it is substantially fixed with respect to displacement in the axial direction as can be seen in FIG. 1, it is not necessary to provide additional securing means at the input part 14 or at the output part 20. Further, a pin could be fixed in each of the end regions of the coupling member 30 and would then engage in a corresponding recess in the input part 14 on one side and in the output part 20 on the other side.

The sliding bearing sleeves 34, 40 can also be constructed in such a way that they are held either at the associated pin or axial projection and slide along the other structural component part, i.e., the coupling member or recess, or in such a way that they are arranged on the pin or projection so as to be rotatable and accordingly roll along the other structural component part accompanied by a sliding movement. Further, it is possible for the sliding bearing sleeve 34 to be fixed at the coupling member 30 and to slide along the pin 32.

Figure 2:
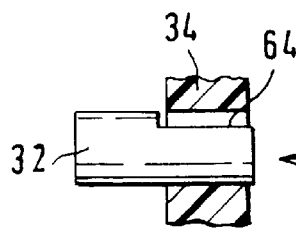
FIGS. 2 to 12 show constructions of coupling pins and sliding bearing parts by which coupling members of the torsional vibration damper can be connected with input parts and output parts of the torsional vibration damper.
Figure 3:
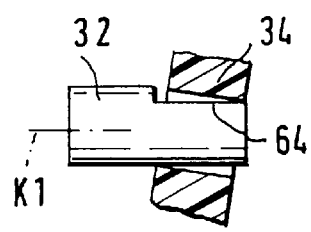
Figure 4:
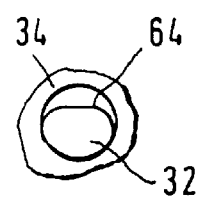

FIGS. 2 to 12 show different embodiments of the sliding bearing sleeves 34, 40 and the pin 32 which enable a tiltable coupling of the coupling member 30 with the input part 14 and/or the output part 20. As can be seen in FIGS. 2 and 4, the portion 64 of the pin 32 enclosed by the sliding bearing sleeve 34 has a cross-sectional shape diverging from the circular shape, i.e., a cross-sectional shape which is flattened in at least some areas. As a result, the pin 32 is received in the sliding bearing sleeve 34 in this area with movement play as can be seen in FIG. 3, so that the sliding bearing sleeve 34, which is fixedly connected with the coupling member 30, for example, is tiltable with respect to the pin 32 and accordingly with respect to the coupling axis K1. Of course, an embodiment in which the pin 32 has a circular cross-sectional shape which is securely received in the sliding bearing sleeve 34 and in which the sliding bearing sleeve 34 is then received with play in the associated recess 36 in the coupling member 30 is also conceivable.

Figure 5:
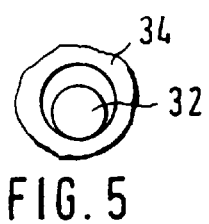
Figure 6:
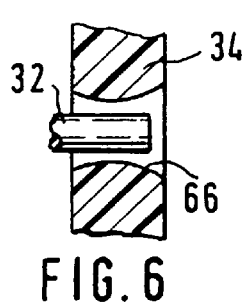

FIG. 5 shows an embodiment in which the pin 32 fundamentally has a smaller diameter than the inner diameter of the sliding bearing sleeve 34. Accordingly, the pin 32 is also received in the sleeve 34 with play and is consequently tiltable. A construction of this kind is also shown in FIG. 6, wherein, however, the sliding bearing sleeve 34 is provided at its inner circumference with an inwardly curved surface 66. This has the advantage that the edge of the sliding bearing sleeve 34 is prevented from resting on the pin 32 when the sliding bearing sleeve 34 is tilted with respect to the pin 32. As a result, wear is appreciably reduced in the area of the pin 32 as well as in the area of the sliding bearing sleeve 34.

Figure 7:
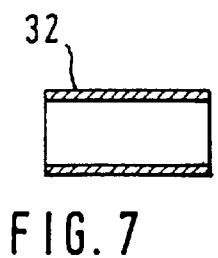
Figure 8:
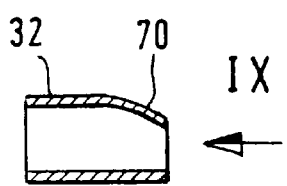
Figure 9:
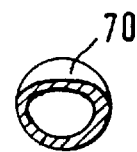

FIGS. 7 to 12 show embodiments in which the pin 32 is elastically deformable. For example, the pin 32 is shown in FIGS. 7, 8 and 9 as a hollow spring steel part which can be deformed when acted upon by force as is shown at 70 in FIGS. 8 and 9. That is, when the sliding bearing sleeve 34 which is supported on the pin 32 is tilted with respect to the pin 32 by the coupling member, the pin 32 can deform elastically so as not to impede the tilting of the sliding bearing sleeve 34 and accordingly the tilting of the coupling member 30.

Figure 10:
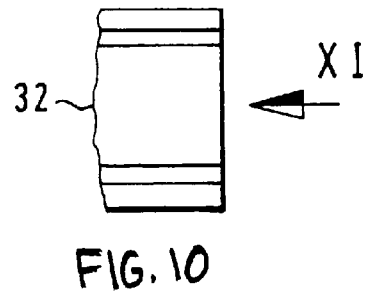
Figure 11:
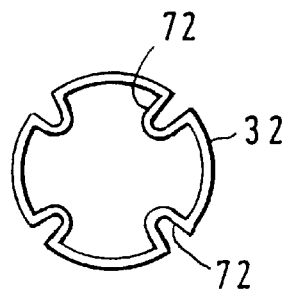
Figure 12:
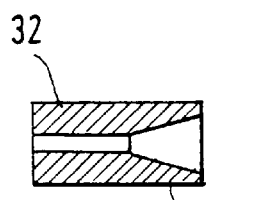

The pin 32 shown in FIGS. 10 and 11 is substantially hollow and is again made of elastically deformable spring steel. A plurality of indentation areas 72 are formed in the longitudinal direction of the pin so that the pin 32 can be deformed relatively easily at least in one or more areas during a tilting of the sliding bearing sleeve 34 on the pin 32.

In the embodiment according to FIG. 12, the pin 32 is again produced from a hollow structural component part made, for example, of spring steel or the like and has a reduced thickness in the area 74 in which the pin is enclosed by the sliding bearing sleeve 34, so that a relatively easy deformation of the pin 32 can be brought about in the radial direction in this case also.

It is noted that the material of the elastically deformable pins that were described with reference to FIGS. 7 to 12 need not necessarily be spring steel. Plastic or other suitable material may also be used for this purpose. It is essential that the pins, while nevertheless possessing the characteristic of elastic deformability, must always be strong enough to receive the rotational force transmitted between the input part and the output part.

Figure 13:
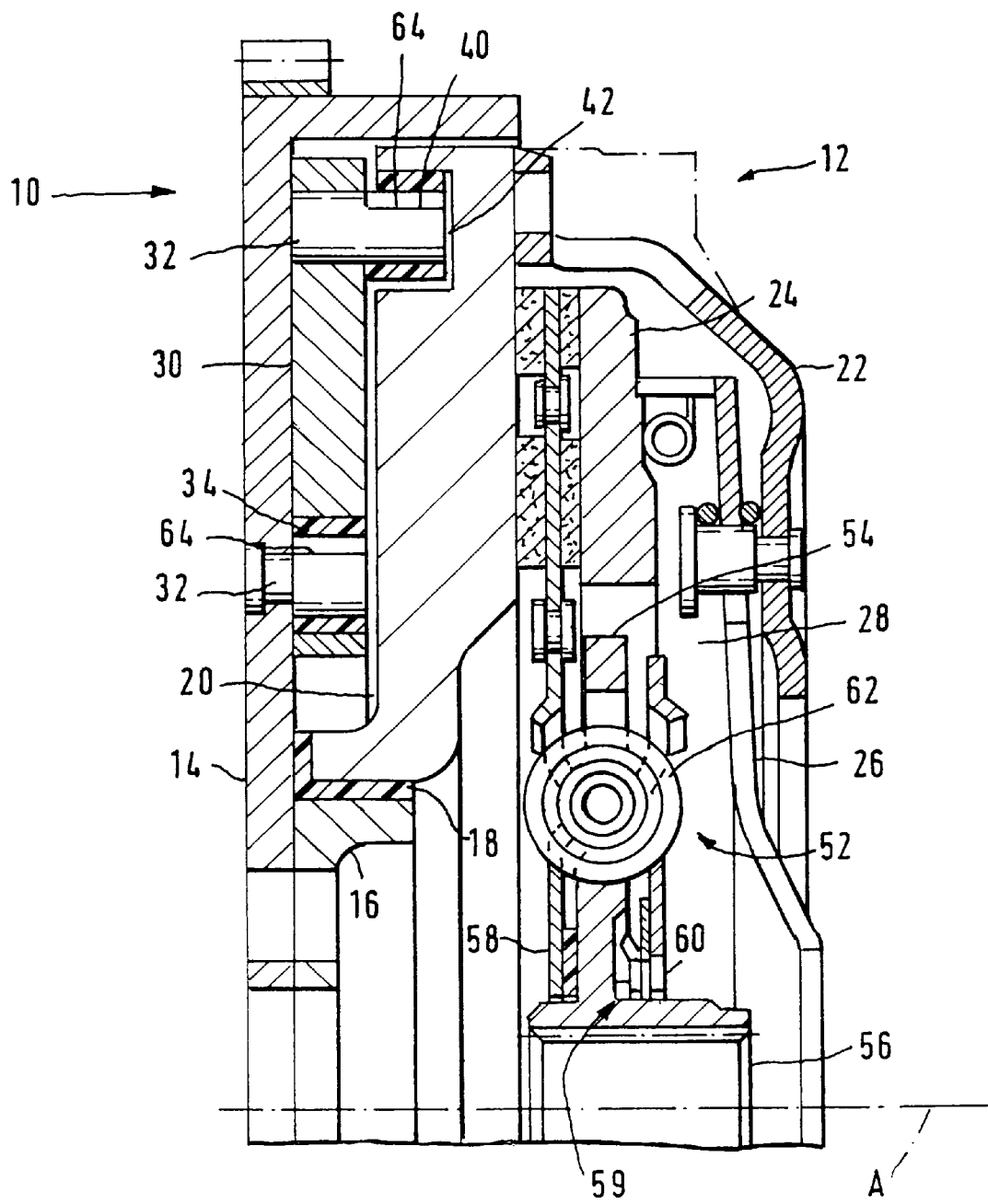
FIG. 13 shows a side view corresponding to FIG. 1 in which the pins shown in FIGS. 2 to 4 are used.

Although the various embodiments of the pin were described above only with respect to the pin 32 which connects the coupling member 30 with the input part 14, a corresponding construction of a pin or projection in the area in which the coupling member 30 is connected with the output part 20 can, of course, be provided. Such a construction is shown, for example, in FIG. 13. In this case, instead of the projection 38 in FIG. 1, a further pin 32 is arranged at the coupling member 30 on the radial outside, which further pin 32 has a corresponding flattened area 64 where it is surrounded by the sliding bearing sleeve 40. With respect to the other structural component parts, the torsional vibration damper shown in FIG. 13 corresponds to the embodiment shown in FIG. 1, wherein reference is had to the preceding description.

FIG. 14 shows an alternative construction of the support of the output part 20 at the input part 14 and the coupling of the coupling member 30 with the input part 14 and the output part 20.

In the embodiment according to FIG. 14, the sliding bearing part 18 is constructed so that it has a spherical cross-sectional contour which is curved radially outward with a curved surface 76. A concave curved surface 78 of the output part 20 which complements the curved surface 76 is guided on this curved surface. When the wobbling movement which was already described with reference to FIG. 1 occurs, for example, in the input part 14, a tilting movement can occur between the input part 14 and the output part 20 due to the connection that is formed in the manner of a ball-and-socket joint between the input part 14 and output part 20, so that the output part 20 is not forced to follow the wobbling movement of the input part 14.

A corresponding spherical construction is also provided in the sliding bearing sleeves 34, 40 in this case. Each of these sliding bearing sleeves has an outwardly curved outer surface 80, 82 which contacts the inner surfaces of the recess 36 and the recess 42, respectively, associated therewith. Accordingly, a ball-and-socket joint type connection is also provided between the coupling member 30 and the respective sliding bearing sleeves 34, 40 in this case. In addition, the ball-and-socket joint type connection for the rotatable support of the input part 14 with respect to the output part 20 as well as for mounting the coupling member 30 at the input part 14 and at the output part 20 contributes during the occurrence of tilting to the prevention of so-called edge carrying, in which one edge of one of the structural component parts presses into the material, for example, of the sliding bearing, at the other structural component part. The embodiment shown in FIG. 14 has the advantage, in addition to easy tiltability, that damage caused by wear can be prevented in the area of the sliding bearing materials. In order to facilitate tilting, in addition, the use of elastically deformable sliding bearing materials is also possible in this case. Further, it is possible for the portions of the recesses 36 or 42 contacting the sliding bearing sleeves 34, 40 to have a corresponding concave curvature like in the region of surface 78 at the output part 20.

It will be noted in this connection that, as can also be seen in FIG. 1 by plane $E_T'$, not only can the input part 14 be exposed to a wobbling movement, but a wobbling movement can also be forced on the output part 20, for example, by means of an out-of-true running of the transmission input shaft. Even if both the input part 14 and the output part 20 are deflected from their planes E and E', respectively, for example, into planes $E_T$ and $E_T'$, respectively, this does not lead to a secondary bending movement in any bearing areas in the torsional vibration damper according to the invention, so that the transmission of a wobbling movement from the input part to the output part or from the output part to the input part can be prevented.

In the embodiment according to FIG. 14, the clutch disk does not have the torsional vibration damper 52 described above, but rather the central disk part 54 connects the hub 56 directly with the friction facings of the clutch disk 28. Of course, it is also possible to provide a spring torsional vibration damper of the kind described above in this embodiment.

FIGS. 15 to 17 show different embodiments of the sliding bearing sleeve 34 and of a rolling element bearing 84. The sliding bearing sleeve 34 shown in FIG. 15 has a substantially S-shaped cross-sectional shape of its annular portion. This S-shape allows a tilting of the free legs 86, 88 of the S-shape relative to one another in order to enable the tilting of the coupling part 30 with respect to the pin 32 in a corresponding manner, as well as a compression of the S-shape with the legs 86, 88 approaching one another. Accordingly, a tilting capability in the coupling members 30 with respect to the pin 32 is ensured by the sliding bearing sleeve 34 shown in FIG. 15 on the one hand and, on the other hand, a vibration damping function is introduced in the region of the sliding bearing sleeve 34 by means of the elastic compression with the legs 86, 88 approaching one another. The sliding bearing sleeve 34 can also contribute to the damping of torsional vibrations at high rates of rotation as was already mentioned above.

In the embodiment according to FIG. 16, a rolling element bearing 84 with an outer bearing ring 90 and an inner bearing ring 92 is provided instead of a sliding bearing housing. A plurality of rolling elements, not shown in the Figure, run between the bearing rings 90, 92. It is especially advantageous in this instance to construct the rolling element bearing 84 as spherical roller bearing or ball bearing or as a grooved ball bearing with extensive play. Such constructions of the rolling element bearing likewise permit a relative displacement between the outer bearing ring 90 and the inner bearing ring 92 to enable the tilting of the pin 32. As can be seen in FIG. 16, a rolling element bearing of this kind can surround the projection 38 and also be arranged so as to be inserted into the recess 36 of the coupling member 30.

FIG. 17 again shows a sliding bearing sleeve with an outer sliding bearing ring 94 and an inner sliding bearing ring 96 and a ring 98 of elastically deformable material arranged therebetween. These three rings 94, 96, 98 are fixedly connected with one another. The elastically deformable ring 98 permits the tilting of the sliding bearing rings 94, 96 with respect to one another and, because of its compressibility, again provides a vibration damping function in the region of the coupling connection of the coupling members 30 to the input part 14 and the output part 20. It should be mentioned in this regard that the ring made from elastically deformable material can have different cross-sectional shapes as is indicated in FIG. 17.

Figure 18:
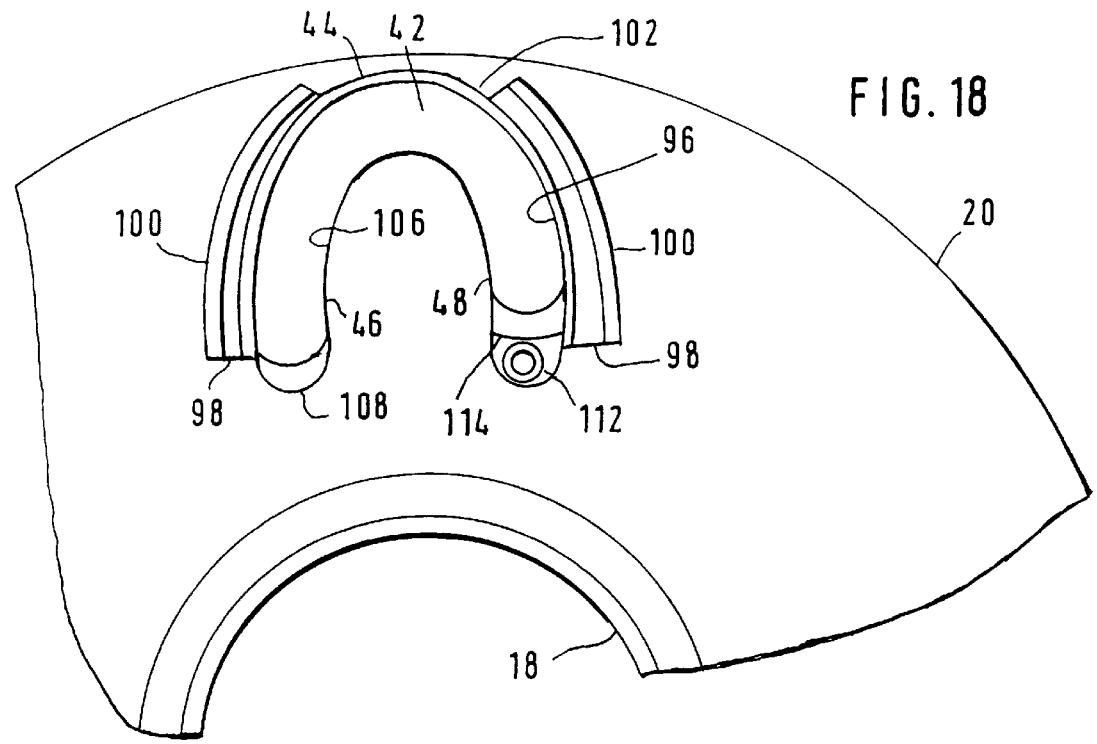
FIG. 18 shows a view of the output part of the torsional vibration damper according to the invention in the region of a U-shaped guide recess.
Figure 19:
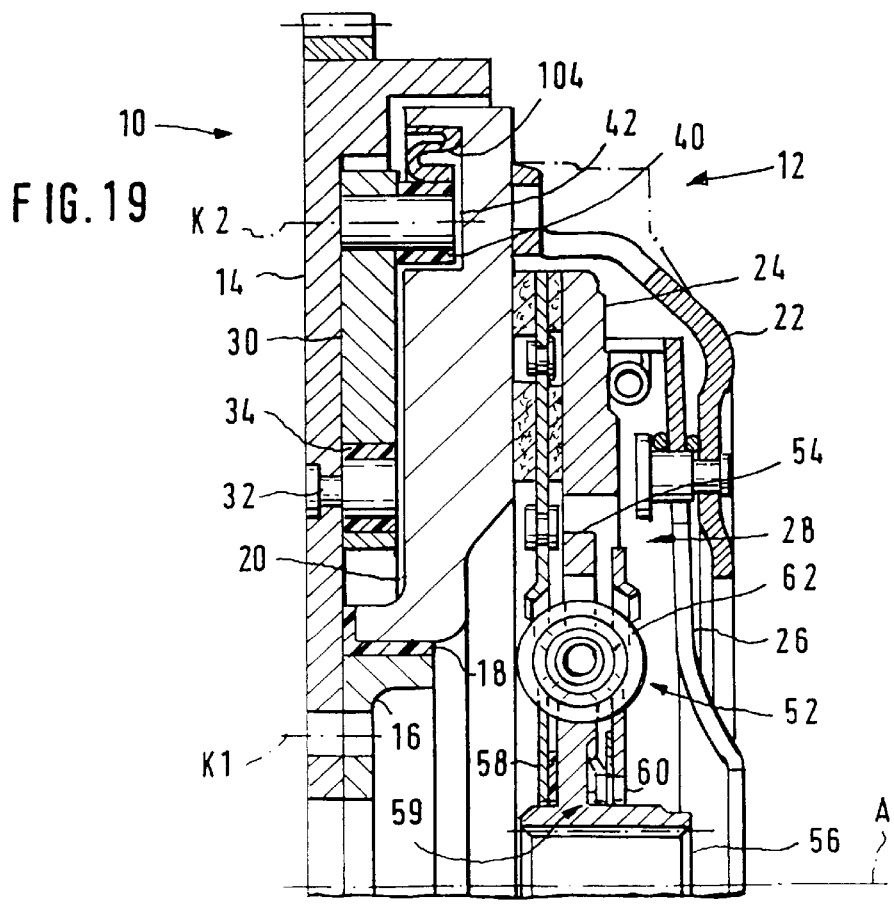
FIG. 19 shows a longitudinal sectional view corresponding to FIG. 1 in which the construction of the guide recess shown in FIG. 18 is used.
Figure 20:
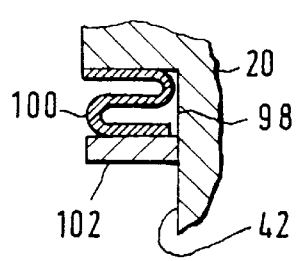
FIG. 20 shows an alternative construction of a damping portion of the guide recess.

FIGS. 18 to 20 show an embodiment of the torsional vibration damper 10 according to the invention in which the elongated U-shaped or V-shaped recess 42, in which the sliding bearing sleeve 40 arranged at the coupling member 32 is displaceable, forms a running path 96 which is elastically deformable at least in one or more areas. For this purpose, an elongated, elastically deformable bearing part 100 with a substantially S-shaped or Z-shaped cross section is arranged in recess portions 98 of the output pat 20 which laterally widen the recess 42. An insert part 102 which forms the running path 96 and extends substantially over the entire length of the recess 42 is arranged at the side of each bearing part 100 located toward the recess 42. The bearing parts 100 are divided so that a bearing part 100 lies in the area of each leg 46, 48 of the recess 42. When torque is transmitted between the input part 14 and the output part 20 during operation, as a result of which, as was already described, the portion of the coupling member 30 engaging in the recess 42 moves into one of the legs 46, 48 proceeding from the vertex 44, this portion of the coupling member 30, i.e., the sliding bearing sleeve 40, moves into the area in which the insert part 102 is deposited through the elastically deformable bearing parts 100. In this area, the running path 96 is therefore flexible and accordingly again permits the damping of vibrations occurring in load operation. The insert part 102 forming the running path 96 can be formed from hardened material, for example, hardened steel or the like. Since the insert part 102 substantially extends along the entire length of the recess 42, the problem posed by the sliding bearing sleeve 40 striking against an edge formed in the output part 20 at the ends of the bearing parts 100 near the vertex 44 as the sliding bearing sleeve 40 moves past these end regions does not arise. Since there are essentially no force influences generated normal to the running path 96 in the region of the vertex 44 as a result of the transmission of load, and, instead, only the influence of centrifugal force causes the sliding bearing sleeve 40 to rest against the running path 96, it is not necessary to provide a correspondingly deformable portion like the bearing parts 100. However, this is possible. When using a bearing part 104 which extends along the entire recess 42 like the insert part 102, as is shown, for example, in FIG. 19, the insert part 102 can be dispensed with because the bearing part 104 forms a completely continuous running path.

Since the sliding bearing sleeve 40 can slide or roll along the outer surface of the recess 42 formed by the running path 96 in FIG. 18 as well as at the inner surface 106 depending on the effect of the introduced load, it is possible to provide a correspondingly elastically deformable wall portion, i.e., a flexible running path, in the area of the inner surface 106 also as is shown in FIG. 18 with respect to the area of the outer surface.

If an insert part 102 is not provided, it is advantageous when at least the area of the bearing part 104 in FIG. 19 which then forms the running path and at which the sliding bearing sleeve 40 can slide or roll along is hardened in order to prevent excessive wear.

In addition to the possibility of damping vibrations occurring during load operation, an additional advantage in providing an at least partially flexible wall area of the recess 42 is in that a tilting of the coupling member 30 is made possible with respect to the coupling axis K2 and with respect to the output part 20 due to the flexibility, so that the free tilting of the input part 14 and the output part 20 is also not impeded in an embodiment of this kind.

Figure 25:
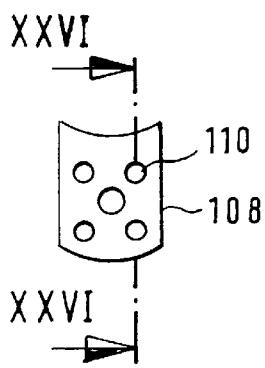
Figure 26:
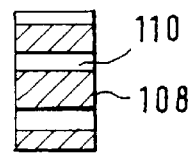

As can further be seen in FIG. 18, end stops are provided in the region of the free ends of the legs 46, 48. These end stops ensure that the sliding bearing sleeve 40 or the area of the coupling member 30 engaging in the recess 42 does not abruptly strike the ends in a state of very great load transmission, but rather is braked in a damped manner. For this purpose, an elastically deformable plastic part 108 is inserted in the leg 46, for example, as is also shown in FIGS. 25 and 26. In order to be able to set the damping characteristic of this plastic part, it can have a plurality of openings or recesses 110.

An elastically deformable tube portion 112 is arranged in the leg 48, wherein a stop part 114 lies on the elastically deformable tube portion 112. If the sliding bearing sleeve 40 moves in the leg 48 and, in so doing, comes to a stop at the stop part 114, the elastically deformable tube portion 112 is deformed and accordingly leads to a gentle damping of the movement. The tube portion 112 can be made from plastic, spring steel or the like, for example.

Figure 21:
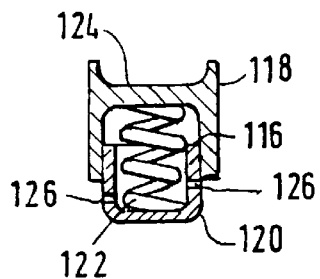
FIGS. 21 to 26 show different construction forms for end stop dampers which can be arranged in the guide recess.
Figure 22:
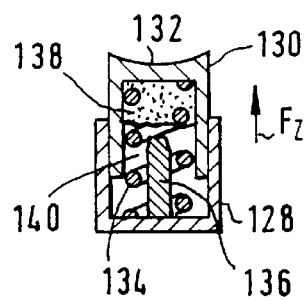

FIGS. 21 to 24 show further embodiments of end stops. In FIG. 21, a telescoping end stop 116 is provided with an outer cylindrical sleeve 118 and an inner cylindrical sleeve 120. A helical compression spring 122 acts between the outer cylindrical sleeve 118 and the inner cylindrical sleeve 120. The outer cylindrical sleeve 118 forms a stop surface 124 whose outer contour is adapted to the circumferential shape of the sliding bearing sleeve 40. Openings 126 are formed in the inner cylindrical sleeve 120 which enable a throttled escape of air during the compression of the helical compression spring 122. Thus, in addition to the spring damping force of the helical compression spring 122, another damping component is introduced through the openings 126.

FIG. 22 again shows an end stop with an outer cylindrical sleeve 128 and an inner cylindrical sleeve 130, wherein the stop surface 132 is formed at the inner cylindrical sleeve 130. A helical compression spring 134 again acts between the outer cylindrical sleeve 128 and the inner cylindrical sleeve 130. A pin 136 is fastened at the outer cylindrical sleeve 128 in such a way that it extends centrally through the helical compression spring 134. Further, a damping fluid 138 is arranged in the space enclosed by the outer cylindrical sleeve 128 and the inner cylindrical sleeve 130. During the rotation of the torsional vibration damper and the force applied by the centrifugal force in the direction of arrow $F_z$ in FIG. 22, the fluid 138 moves into the base region of the inner cylindrical sleeve 130. When the sliding bearing sleeve 40 contacts the stop surface 132 and accordingly compresses the helical compression spring 134, the projection 136 is immersed in the fluid 138 and displaces it. Since only narrow passages 140 are formed between the projection 136 and the turns of the helical compression spring 134, the displacement of the fluid 138 takes place by a throttling effect, so that a damping is provided in this case in the manner of a fluid damper. In addition, as a result of the compression of the helical compression spring 134 and the displacement of the fluid 138, the enclosed air is compressed, which additionally has a damping effect.

Figure 23:
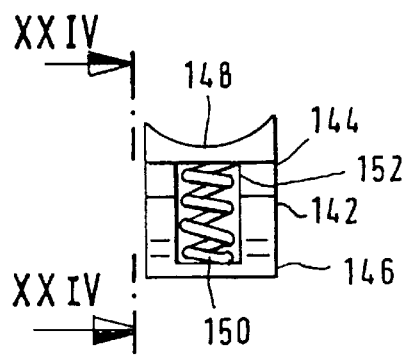
Figure 24:
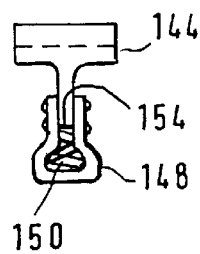

FIGS. 23 and 24 show an embodiment of an end stop 142 which has two stop parts 144, 146 which are displaceable relative to one another, wherein the stop face 148 is again formed at the stop part 144. A helical compression spring 150 acts between the stop part 144 and the stop part 146. This helical compression spring 150 is compressed when the sliding bearing sleeve 40 stops at the stop face 148 and accordingly enables a gentle damping of the movement. In FIG. 23, the stop part 144 has a groove 152 into which the helical compression spring 150 extends. In the embodiment according to FIG. 24 the helical compression spring 150 contacts an end face 154 of the stop part 144.

By providing end stops of the type mentioned above in the area of the free ends of the legs 46, 48, the sliding bearing sleeve 40 is prevented from spontaneously striking the respective ends of the legs 46, 48 when a large load is transmitted. On the other hand, these compressible end stops also provide a damping function for torsional vibrations occurring during operation when a very large load is transmitted, for example, at a low rate of rotation, that is, in a state in which the sliding bearing sleeve is arranged in the end region of the legs 46, 48.

Figure 27:
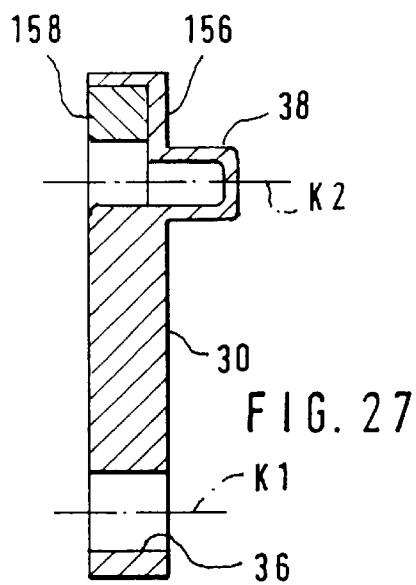
FIGS. 27 and 28 show alternative constructions of a coupling member.
Figure 28:
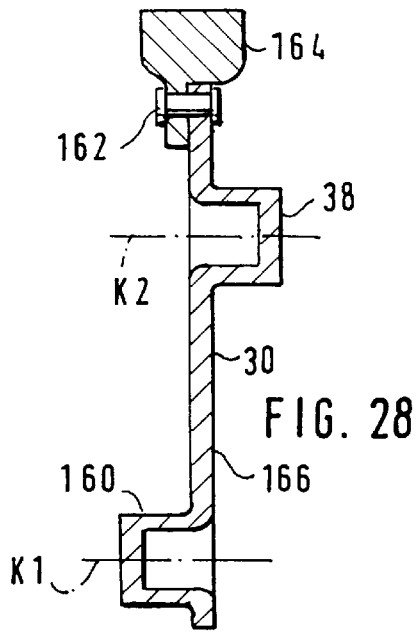

FIGS. 27 and 28 show embodiments of the coupling member 30. As is shown in FIG. 27, the coupling member 30 substantially has the construction shown in FIG. 1 with the recess 36 arranged on the inside and the axial projection 38 arranged externally. The coupling member 30 can be manufactured from steel or from some other metal, for example. In the radial outer region, i.e., radially outside the projection 38, a cut out portion 156 is provided in which a material 158 with greater density than the material of the coupling member 30 is inserted. For example, the material 158 can comprise lead or the like. The damping behavior of the coupling member 30 which is dependent on the rate of rotation and which was already described above can be influenced by providing a heavier material in this area of the coupling member 30. In principle, it is also possible to leave the cut out portion 156 empty instead of providing the material 158 therein, so that an oppositely acting effect is achieved, that is, the centrifugal force of the coupling member 30 generated during the rotation of the torsional vibration damper is reduced.

FIG. 28 shows a coupling member 30 which has the axial projection 38 on the radial outside and an axial projection 160 on the radial inner side, which are formed by deep drawing, stamping or the like. The coupling member 30 can be formed, for example, from steel plate or the like. A mass part 164 which has a density greater than or equal to that of the material of the coupling member 30 is fastened to the coupling member 30 radially outside of the projection 38 by means of a rivet 162 or the like. A change in the effect of the centrifugal force is also achieved in this case.

Since the coupling member 30 shown in FIG. 28 is made from a relatively thin material, for example, steel plate or the like, it is elastically bendable due to its elongated construction especially in its central area 166. That is, when bending occurs in this central portion 166, the coupling axes K1 and K2 lying in the drawing plane are tilted with respect to one another in the drawing plane. Accordingly, a tilting of the input part 14 and the output part 20 relative to one another is also possible again, also in the case of a relatively rigid coupling of the coupling member 30 to the input part 14 or to the output part 20 with respect to tilting, because the coupling member 30 does not hinder this tilting movement as a result of bending in the central area 166.

Figure 29:
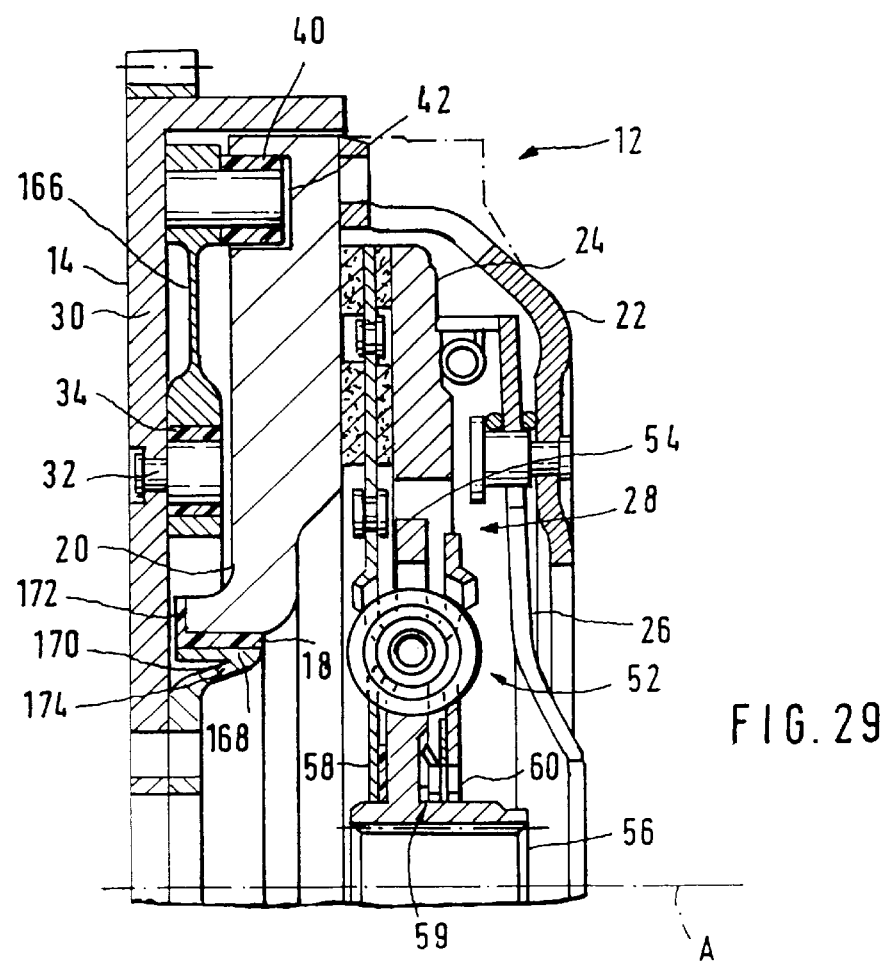
FIG. 29 is a sectional view corresponding to FIG. 1 in which the coupling member is deformable in its intermediate area in the axial direction.

FIG. 29 shows another embodiment in which the coupling member 30 is thinner in its central area 166 than in its end regions in which it is coupled with the input part 14 or with the output part 20. Accordingly, in this case also, when a relatively rigid material is used for the coupling member, for example, steel or the like, it can be ensured due to the thinning of the central region 166 that the coupling member 30 can bend in this central region 166 in the axial direction in order to enable, or not to hinder, the wobbling movement, i.e., the tilting of the input part 14 and the output part 20.

As can further be seen in FIG. 29, the output part 20 is supported at the input part 14 by the sliding bearing part 18 and an elastically deformable bearing angle part 168. The bearing angle part 168 has an elastically deformable intermediate portion 170 which enables the tilting of the input part 14 and the output part 20 with respect to one another when a wobbling movement occurs. In order not to impede this tilting, a gap 172 is formed between the sliding bearing part 16 or bearing angle part 168, respectively, in the region of the bearing support of the output part 20 on the same, and the input part 14, so that when, for example, the portion of the output part 20 which lies above the axis of rotation A and is shown in FIG. 29 moves away from the input part 14, the portion of the output part 20 lying below the axis of rotation A, not shown in FIG. 29, can move toward the input part 14.

The bearing part 168 can be made from a steel part or the like, for example, which allows the wobbling movement due to the fact that the elastically deformable intermediate portion 170 is provided. In addition, it is also possible to use elastically deformable material for the sliding bearing part 18 in order to further facilitate the tilting capability between the input part 14 and the output part 20.

Instead of or in addition to providing the elastically deformable bearing part 168, a construction in which the output part 20 is elastically deformable in its area located near the bearing area, i.e., in the sliding bearing portion 18, e.g., at 174, would also be possible. This could be achieved, for example, in that a radial outer area of the output part 20 is formed from a relatively massive and rigid steel body in the shape of a circular disk which is connected in its radial inner region with a plate portion or the like which also serves, for example, to support the input part 14. A construction in which the output part 20 is formed essentially in its entirety from an elastically deformable plate part or the like is also possible, wherein a friction face lining made from relatively rigid, hard material is arranged and fixed on the elastically deformable plate part in the area in which the clutch disk is pressed against the output part 20.

FIGS. 30 to 32 show an embodiment in which a friction force generation device is associated with the coupling member 30. For this purpose, the coupling member 30 has, in its end region coupled with the output part 20, a friction part 176 which lies substantially transverse to the longitudinal direction of the coupling member 30. A friction shoe 178 with a substantially U-shaped cross section is fixed to the output part 20. If the input part 14 moves out of the relative position, shown in FIG. 30, between the input part 14 and the output part 20, in which position the input part 14 is rotated in the counterclockwise direction with respect to the output part 20, and accordingly if the coupling axis K1 is moved in the clockwise direction and in the direction of arrow P1, the coupling part 30 initially moves in the direction of arrow P2 toward the friction shoe 178. In so doing, the friction part 176 of the coupling member 30 dips into the friction shoe 178 from the bottom in the direction of the arrow P2. The friction shoe 178 is widened outward substantially conically in its two ends located opposite one another in the circumferential direction and in its end region which faces radially inward, so that a correspondingly conically shaped end region 180 of the friction part 176 can dip into the friction shoe 178. Friction facings can be provided at the friction shoe 178 and/or at the friction part 176, which friction facings provide a relatively large friction force when the friction part 176 dips into the friction shoe 178. When the coupling axis K1 moves further in the clockwise direction and in the direction of arrow P1 with respect to the output part 20 beyond a center axis M defining a basic position, i.e., a position in which no load is transmitted, the coupling axis K2, i.e., the sliding bearing sleeve 40, is pulled into the leg 48, wherein the friction part 176 is pulled out of the friction shoe 178 again with a continued movement of this kind.

It can be seen that a friction force is generated in particular when the coupling axis K2 lies in the area of the vertex 44 of the recess 42 due to the cooperation of the friction shoe 178 with the friction part 176 provided at the coupling member 30. That is, a friction force is generated at very high rates of rotation or when virtually no load is generated. Further, a friction force is generated when load alternation takes place, i.e., when passing from pull operation to push operation, for example. In particular, during load alternation of this kind, a load shock can be prevented by the friction force when the sliding bearing sleeve 40 passes from the leg 46 into the leg 48 and vice versa.

Although this is not shown in the drawings, it is possible, of course, for a friction force of this kind to be provided not only in the crossover region, i.e., during the positioning of the coupling axis K2 in the region of the vertex 44, but also in other regions of the recess 42. It is further noted, although this is not shown in FIG. 30, that the recess 42 can also be provided with an at least partially elastically deformable running path in this embodiment also, both on the inside and outside as well as with end stops in the area of the free ends of the legs 46, 48.

Figure 33:
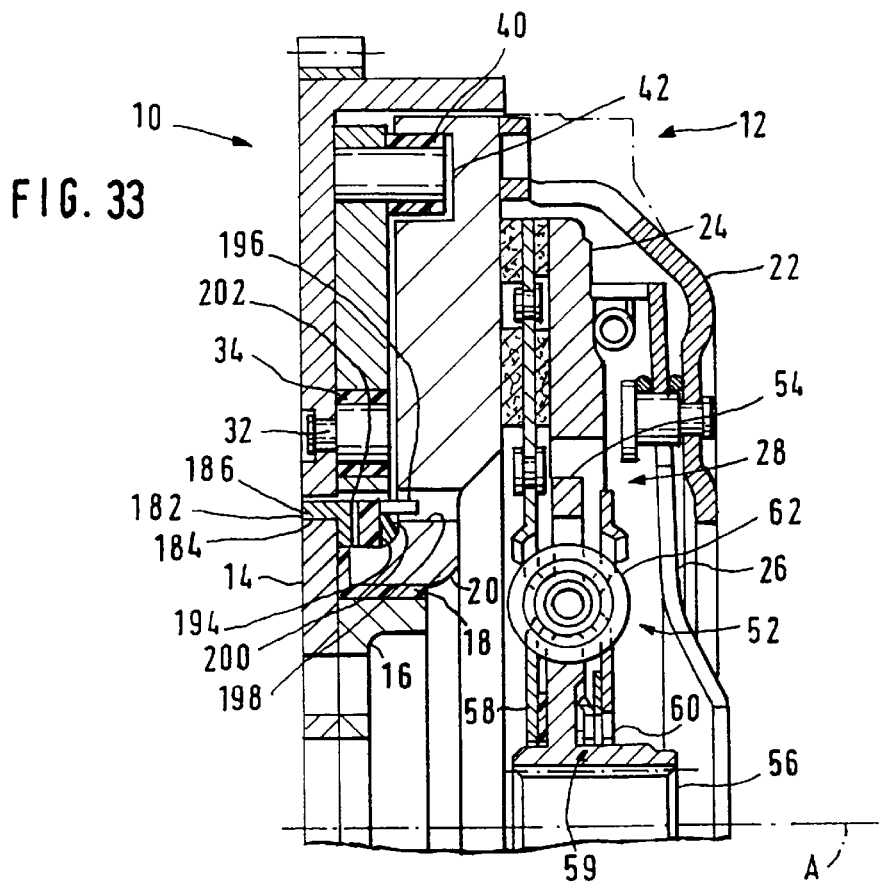
FIG. 33 is a sectional view of a torsional vibration damper corresponding to FIG. 1 with a friction force generation device acting between the input part and the output part.
Figure 34:
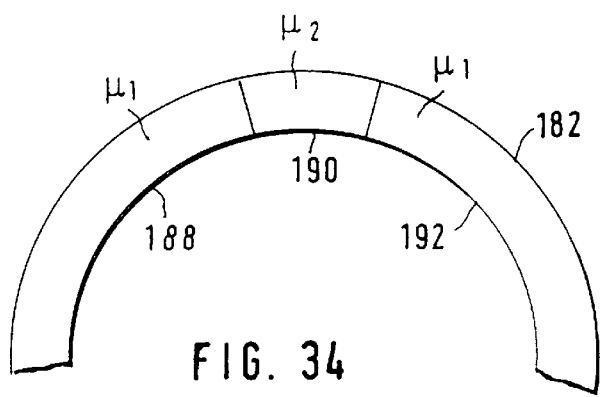
FIGS. 34 and 35 show detailed views of the friction force generation device.
Figure 35:
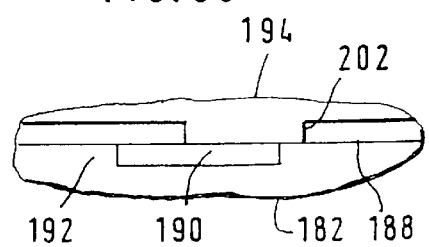

FIGS. 33 to 35 show an embodiment of a friction force generation device which again generates a friction force depending on the state of relative rotation between the input part 14 and the output part 20. A friction ring 182 is arranged at the input part 14. The friction ring 182 engages in recesses 184 in the input part 14 by means of axial projections 186 and is accordingly held so as to be fixed with respect to rotation relative to the input part 14. As can be seen in FIG. 34, the friction ring 182 is a composite friction ring having segments 188, 190, 192 with different coefficients of friction $\mu1$ and $\mu2$. In particular, this construction is carried out in such a way that the segments 188, 190 have the same coefficient of friction $\mu1$, whereas segment 190 has a coefficient of friction $\mu2$ which is greater than the coefficient of friction $\mu1$.

A counter-friction part 194 is arranged at the output part 20. The counter-friction part 194 engages, again by means of axial projections 196, in recesses 198 in the output part 20 and is accordingly held at the output part 20 so as to be fixed with respect to rotation relative to it. A spring 200, for example, a plate spring 200 or the like, presses the counter-friction part 194 against the composite friction ring 182 via a projection 202. When relative rotation occurs between the input part 14 and the output part 20, the projection 202 is displaced on the surface of the composite friction ring 182 and generates a friction force because of the pretensioning of the spring 200, the amount of this friction force depending on which of the segments 188, 190, 192 of the composite friction ring 182 the projection 202 is located across from. In this case also, the positioning of the composite friction ring 182 or of the projection 202 can be carried out so that a greater friction force is generated in the state in which there is substantially no load transmitted between the input part 14 and the output part 20, i.e., in the state in which, as was described above with reference to FIG. 30, the coupling axis K2 lies in the area of the vertex 44 of the recess 42, i.e., the projection 202 lies opposite portion 190 with the greater coefficient of friction. Of course, the selection and the arrangement of the areas with different coefficients of friction are not limited to those described above; rather, depending on the requirements occurring during operation, for example, a greater friction force is generated in the areas of maximum load transmission than in the area of smaller load transmission. Further, it goes without saying that the counter-friction part 194 need not have only one projection 202, but rather can have a plurality of such projections distributed along its circumference and that the composite friction ring 182 can have a correspondingly cyclic pattern at segments 188, 190, 192. Further, it is possible to arrange the composite friction ring 182 at the output part 20 and to arrange the counter-friction part 194 at the input part 14.

It is noted in this connection that a wide variety of arrangements can be used for providing the friction force. For example, it is also readily possible to arrange a suitable friction device in the area of the sliding bearing part 18 or to introduce a friction device constructed in a modular manner as a separate structural component part between the input part 14 and the output part 20. For example, a modular friction arrangement of this kind can also operate by utilizing the friction forces generated in a viscous fluid.

FIGS. 36 and 37 show additional embodiments of coupling members 30 which are elastically deformable in the longitudinal direction. In FIG. 36, the coupling member 30 has an outer coupling part 204 which is enclosed in its radial inner area by two inner coupling parts 206, 208. Spring windows 210, and 212, 214 are arranged in the outer coupling part 204 and in the inner coupling parts 206, 208, respectively. A helical compression spring 216 is then positioned in these spring windows. The inner coupling parts 206, 208 are arranged at the pin 32. The outer coupling part 204 again has the axial projection 38 by which it can engage in the recess 42, possibly with the intermediary of a sliding bearing sleeve 40. When a load is transmitted by the coupling member 30, a load vibration can be intercepted in the coupling member 30 by means of the elastic deformation of the helical compression spring 216. That is, a coupling member 30 constructed in this manner also introduces an additional damping function which is substantially independent from the rate of rotation and which still enables a damping of torsional vibrations occurring in operation even at relatively high rates of rotation.

In the embodiment according to FIG. 37, the outer coupling part 218 is coupled directly with the pin 32 by a helical tension spring 220. The outer coupling part 218 again has the axial projection 38. This coupling member 30 shown in FIG. 37 is also elastically deformable in its longitudinal direction, i.e., in a connecting line connecting the coupling axes K2 and K1, and enables a damping of vibrations substantially independent from the rate of rotation. The selection of the spring constant of the helical compression spring 216 or of the helical tension spring 220 and the lengths of the springs and accordingly the lengths of the individual coupling parts or a possibly graduated arrangement of a plurality of springs for providing a graduated damping force can be selected corresponding to the requirements occurring in operation.

FIG. 38 shows another embodiment of a coupling member 30 which is deformable in its longitudinal direction as well as in the axial direction of the axis of rotation A. The coupling member 30 is constructed in a wavy manner in its intermediate area 222 located between the coupling axes K1 and K2. Due to this wavy construction, an elongation is made possible in the direction of the connection line connecting the coupling axes K1 and K2 in the manner of an accordion, and a deformation is also enabled in the direction of the axis of rotation A, i.e., transverse to this connection line direction. This coupling member 30 thus permits a damping of the torsional vibrations occurring in operation independently from the rate of rotation as well as a relative tilting between the input part and output part.

In the embodiment according to FIG. 38, the coupling member 30 is further arranged in a space which is tight against fluid toward the radial outer side. The fluid-tight space 226 is defined by the output part 20, by a cylindrical wall portion 228 which is connected on the radial outer side with the output part 20 and which extends in the axial direction, and by a disk-shaped wall portion 230 which extends radially inward from the wall portion 228. A viscous fluid 232 is arranged in the space 226 and surrounds the coupling member 30 at least partially. That is, the coupling member 30 moves in the viscous fluid 232 and when torsional vibrations occur which lead to corresponding vibrating movements of the coupling member 30, the viscous fluid 232 contributes additionally to a damping. Further, the viscous fluid has a lubricating function, so that an improved function can be provided in the area of the sliding bearing sleeves 40, 34.

As can further be seen in FIG. 38, instead of the pin 32 at the input part 14, an axial projection 224 is produced by deep drawing, stamping or the like, and the sliding bearing sleeve 34 is supported thereon. This has the advantage that no leakage is introduced in the region of the connection of a pin with the input part 14 when fluid is provided. The space 226 is sealed toward the radial inner side by the sliding bearing part 18 cooperating with the output part 20 and by the bearing angle piece 16. Further, a sealing material, not shown in the Figure, for example, a sealing ring, can be arranged between the wall portion 230 and the input part 14. This sealing ring is advantageously arranged as close as possible to the radially inner end of the wall portion 230 because the length of the portion to be sealed can then be appreciably reduced compared with a seal located further outside radially. Of course, it is also possible to carry out the sealing between a radial outer end face 234 of the output part 20 and an axially extending cylindrical portion 236 which is connected with the input part 14 so as to be fixed or integral therewith. In a case such as this, the wall portions 228 and 230 could be dispensed with.

In the embodiment shown in FIG. 38, in which the coupling member 30 moves in a viscous fluid, it can be advantageous to provide paddle-like elements at the coupling member 30 which enlarge the surface of the coupling member 30 so as also to increase the frictional resistance for the viscous fluid 232. For example, the mass part 164 which can also be seen in FIG. 28 can assume a "paddle function" of this kind because it increases the cross-sectional area of the coupling member 30, especially in the radial outer region which moves the fastest during a swiveling movement.

The different embodiments of the torsional vibration damper according to the invention which were described above are constructed in such a way that they enable a tilting of the input part and the output part relative to one another. A tilting of this kind can occur when bending vibrations are generated in the crankshaft or when there is a slight axial offset between the crankshaft and the transmission input shaft. As a result of the different constructions of the connection, i.e., the bearing support between the input part and the output part, which enable a tilting of the two parts relative to one another, an edge pressing in the region of the bearing is prevented, which promotes free tilting on the one hand and prevents excessive stress on the bearing on the other hand. Since, further, a tilting capability is made possible between the input part and the output part and the coupling member in the area of the coupling of the coupling member to the input part and/or the output part, the free tilting capability between the input part and the output part is also substantially unimpaired in this region. By providing a friction force generation device and introducing additional elasticity providing a damping of vibrations independent from the rate of rotation, a reliable damping of torsional vibrations occurring in the drivetrain can also be ensured at high rates of rotation in which the coupling is increasingly stiffened by the coupling members. This does not depend on whether the driving force of an internal combustion engine is transmitted via the torsional vibration damper to driving wheels or whether a driving force is transmitted from the driving wheels to the internal combustion engine, for example, in a motor braking operation. In order to achieve a stiffness of the coupling/damping device which increases as the rate of rotation increases also at high rates of rotation, it is further possible to provide additional damper mass parts which can be switched on or off depending upon the rate of rotation. For example, such additional damper mass parts can be switched on in the range of higher rates of rotation when it is expected that torsional vibrations or the like will occur in this range. Further, the shape of at least one of the elongated recesses can be selected in such a way for providing a damping characteristic that is substantially independent from the rate of rotation that it has, in one or more areas, an extension component extending substantially in the circumferential direction and accordingly only slight radial displacements of the associated coupling member are generated during relative displacement between the input part and output part.

Further, it is noted that the coupling members can be arranged at the output part so as to be rotatable and can engage in correspondingly shaped grooves in the input part. Further, the bearing point of the coupling members at the input part or the output part can be arranged at different radial regions, as is shown, so that the respective coupling members can also extend substantially in the circumferential direction, for example, and can engage in grooves at the respective other part, which grooves follow the articulation at the input part or output part in the circumferential direction.

While only one individual coupling member is shown in the drawings, a plurality of such coupling members can, of course, be arranged at substantially equal angular intervals from one another along the circumference of the torsional vibration damper around the axis of rotation. Further, it will be self-explanatory for the person skilled in the art that different embodiments described above can be combined with one another so as to unite the respective advantages of the different embodiments.

The following remarks pertain to the expressions employed in the preceding description and in the claims. The expression "damper mass part", as it is used here, does not refer only to an individual part. This expression also comprehends damper mass parts comprising a plurality of individual components. Further, the expression "end regions" is understood herein to comprehend free areas of the respective coupling/damping device which are located in general at the ends and by which the device can be connected with a damper mass part. This expression also refers herein to regions that are remote of the ends and can be utilized for coupling. Further, the expression "acts . . . at . . . damper mass part" comprehends direct action of a coupling/damping device at a damper mass part and, further, comprehends acting at a component connected or coupled with the damper mass part. That is, this expression describes not only direct physical action or coupling, but also every other type of torque-transmitting interaction between a coupling/damping device and a respective damper mass part or structural component part coupled with the respective damper mass part for transmitting torque.

A torsional vibration damper according to the invention comprises an input part, an output part and a plurality of coupling members coupling the input part with the output part. The input part and the output part are tiltable relative to one another so that when a wobbling movement of at least one of the parts occurs, this wobbling movement is not compulsorily or positively transmitted to the other part.

The invention is not limited by the embodiments described above which are presented as examples only but can be modified in various ways within the scope of protection defined by the appended patent claims.

We claim:

1. A torsional vibration damper, comprising:
   a first damper mass part rotatable about an axis of rotation;
   a second damper mass part rotatable about the axis of rotation;
   at least one coupling/damping means for coupling the first damper mass part and the second damper mass part, the coupling/damping means being configured to allow a relative rotation of the first damper mass part and the second damper mass part relative to one another about the axis of rotation, the coupling/damping means being configured to have a first end region with a first coupling region that acts on the first damper mass part, and a second end region with a second coupling region that acts on the second damper mass part, so as to transmit torque between the first damper mass part and the second damper mass part, the coupling/damping means being coupled in its end regions with the respective damper mass parts, so as to be rotatable about respective coupling axes which extend substantially parallel to the axis of rotation, one of the coupling/damping means and at least one of the coupling regions being constructed so that a tilting of the first damper mass part and the second damper mass part relative to one another is essentially not impeded.

2. A torsional vibration damper according to claim 1, wherein the first damper mass part and the second damper mass part are configured so as to be supported at one another in a ball-and-socket type joint manner.

3. A torsional vibration damper according to claim 2, wherein a ball portion of the ball-and-socket-joint is provided at one of the damper mass parts, and a socket portion of the ball-and-socket-joint is provided at another of the damper mass parts.

4. A torsional vibration damper according to claim 1, and further comprising bearing means for mounting together the first damper mass part and the second damper mass part.

5. A torsional vibration damper according to claim 4, wherein the bearing means includes at least one rolling element bearing arranged between the first and the second damper mass parts.

6. A torsional vibration damper according to claim 4, wherein the bearing means is configured so as to enable the damper mass parts to tilt with respect to one another.

7. A torsional vibration damper according to claim 6, therein the sliding bearing is made of an elastically deformable material.

8. A torsional vibration damper according to claim 7, wherein the rolling element bearing comprises at least one bearing which allows tilting.

9. A torsional vibration damper according to claim 8, wherein the at least one bearing is one of a spherical roller bearing, a self-aligning ball bearing, a grooved ball bearing, and a grooved rolling element bearing.

10. A torsional vibration damper according to claim 2, wherein the coupling/damping means includes a pin-shaped projection that extends substantially parallel to the respective coupling axis and is provided in the at least one end region of the coupling/damping means, the coupling/damping means further including another element having a recess, the pin-shaped projection engaging in the recess of the other element of the coupling/damping means so that tilting is possible.

11. A torsional vibration damper according to claim 10, and further comprising bearing means acting between the pin-shaped projection and the recess, the bearing means including two portions that are displaceable relative to one another to enable tilting.

12. A torsional vibration damper according to claim 11, wherein the bearing means is elastically deformable in at least some areas.

13. A torsional vibration damper according to claim 12, wherein the bearing means includes a sliding bearing device.

14. A torsional vibration damper according to claim 11, wherein the bearing means includes one of a spherical roller bearing, a self-aligning ball bearing, a grooved ball bearing, and a grooved rolling element bearing with extensive play.

15. A torsional vibration damper according to claim 10, wherein the pin-shaped projection and the recess are connected with one another as a ball-and-socket joint, a ball-and-socket-joint ball portion being formed at the pin-shaped projection, the recess having a counterbearing portion mounted on the ball-and-socket-joint ball portion.

16. A torsional vibration damper according to claim 15, wherein at least one of the ball-and-socket-joint ball portion and the counterbearing portion having a sliding bearing material portion.

17. A torsional vibration damper according to claim 15, wherein the ball-and-socket-joint ball portion is a convexly curved surface portion of the pin-shaped projection.

18. A torsional vibration damper according to claim 11, wherein the coupling/damping means is elastically deformable in a direction of the axis of rotation at least in a region situated between its end regions essentially orthogonal to a connecting line connecting the end regions.

19. A torsional vibration damper according to claim 10, wherein at least one of a wall portion of the recess and a part of the pin engaging in the recess is elastically deformable.

20. A torsional vibration damper according to claim 10, wherein the pin is configured to have a predetermined movement play in the recess.

21. A torsional vibration damper according to claim 1, and further comprising friction force generating means for generating a friction force, when relative rotation occurs between the first damper mass part and the second damper mass part, that is dependent on an extent of the relative rotation.

22. A torsional vibration damper according to claim 21, wherein the friction force generating means is configured to generate a friction force that assumes a maximum value in a region of a basic rotation position which is a relative rotational position, between the first damper mass part and the second damper mass part, in which no torque is transmitted.

23. A torsional vibration damper according to claim 21, wherein the friction force generating means includes a friction surface part with a coefficient of friction which changes in one friction direction provided at one of the damper mass parts, and a counter-friction surface part provided at the other damper mass part so that the counter-friction surface part is displaced in the friction direction over the friction surface part when relative rotation occurs between the two damper mass parts.

24. A torsional vibration damper according to claim 21, wherein the coupling/damping means includes a friction part, and a counter-friction part provided at one of the damper mass parts, so that the friction part is displaceable along the counter-friction part when a relative rotation occurs for generating friction force.

25. A torsional vibration damper according to claim 21, wherein a space is formed between the first and the second damper mass parts which is fluid tight at least radially outward with respect to the axis of rotation, the coupling/damping means-being arranged in the space, a lubricating/damping fluid which surrounds the coupling/damping means at least in some areas is arranged in the space.

26. A torsional vibration damper according to claim 6, and further comprising friction force generating means for generating a friction force, when relative rotation occurs between the first damper mass part and the second damper mass part, that is dependent on an extent of the relative rotation.

27. A torsional vibration damper according to claim 26, wherein the friction force generating means is configured to generate a friction force that assumes a maximum value in a region of a basic rotation position, which is a relative rotational position between the first damper mass part and the second damper mass part, in which no torque is transmitted.

28. A torsional vibration damper according to claim 26, wherein the friction force generating means includes a friction surface part with a coefficient of friction which changes in one friction direction provided at one of the damper mass parts, and a counter-friction surface part provided at the other damper mass part so that the counter-friction surface part is displaced in the friction direction over the friction surface part when relative rotation occurs between the two damper mass parts.

29. A torsional vibration damper according to claim 26, wherein the coupling/damping means includes a friction part, and a counter-friction part provided at one of the damper mass parts, so that the friction part is displaceable along the counter-friction part when a relative rotation occurs for generating friction force.

30. A torsional vibration damper according to claim 26, wherein a space is formed between the first and the second damper mass parts which is fluid tight at least radially outward with respect to the axis of rotation, the coupling/damping means being arranged in the space, a lubricating/damping fluid which surrounds the coupling/damping means at least in some areas is arranged in the space.

31. A torsional vibration damper, comprising:
    a first damper mass part rotatable about an axis of rotation;
    a second damper mass part rotatable about the axis of rotation;
    at least one coupling/damping means for coupling the first damper mass part and the second damper mass part, the coupling/damping means being configured to allow a relative rotation of the first damper mass part and the second damper mass part relative to one another about the axis of rotation, the coupling/damping means being configured to have a first end region with a first coupling region that acts on the first damper mass part, and a second end region with a second coupling region that acts on the second damper mass part, so as to transmit torque between the first damper mass part and the second damper mass part, the coupling/damping means being coupled in its end regions with the respective damper mass parts so as to be rotatable about respective coupling axes which extend substantially parallel to the axis of rotation; and
    vibration damping means for damping vibrations by elastic deformation of at least one damping component.

32. A torsional vibration damper according to claim 31, wherein the at least one coupling/damping means is elastically deformable in a direction of a connecting line connecting the two end regions.

33. A torsional vibration damper according to claim 32, wherein the coupling/damping means includes at least one damping element in an intermediate portion situated between the end regions.

34. A torsional vibration damper according to claim 33, wherein the at least one damping element is one of a helical tension spring, a helical compression spring and an elastically deformable plastic part.

35. A torsional vibration damper according to claim 31, wherein the coupling/damping means includes a pin-shaped projection provided in at least one end region, the coupling/damping means further including an element with a recess, the pin-shaped projection engaging in the recess.

36. A torsional vibration damper according to claim 35, wherein the recess has a wall portion, at least one of the pin-shaped projection and the recess in a region of the wall portion cooperating with the pin-shaped projection being elastically deformable at least in one area.

37. A torsional vibration damper according to claim 35, and further comprising bearing means acting between the pin-shaped projection and the recess, the bearing means being elastically deformable at least in one area.

38. A torsional vibration damper according to claim 31, and further comprising friction force generating means for generating a friction force, when relative rotation occurs between the first damper mass part and the second damper mass part, that is dependent on an extent of the relative rotation.

39. A torsional vibration damper according to claim 38, wherein the friction force generating means is configured to generate a friction force that assumes a maximum value in a region of a basic rotation position, which is a relative rotational position between the first damper mass part and the second damper mass part, in which no torque is transmitted.

40. A torsional vibration damper according to claim 38, wherein the friction force generating means includes a friction surface part with a coefficient of friction which changes in one friction direction provided at one of the damper mass parts, and a counter-friction surface part provided at the other damper mass part so that the counter-friction surface part is displaced in the friction direction over the friction surface part when relative rotation occurs between the two damper mass parts.

41. A torsional vibration damper according to claim 38, wherein the coupling/damping means includes a friction part, and a counter-friction part provided at one of the damper mass parts, so that the friction part is displaceable along the counter-friction part when a relative rotation occurs for generating friction force.

42. A torsional vibration damper according to claim 38, wherein a space is formed between the first and the second damper mass parts which is fluid tight at least radially outward with respect to the axis of rotation, the coupling/damping means being arranged in the space, a lubricating/damping fluid which surrounds the coupling/damping means at least in some areas is arranged in the space.

43. A torsional vibration damper, comprising:
    a first damper mass part rotatable about an axis of rotation;
    a second damper mass part rotatable about the axis of rotation; and
    at least one coupling/damping means for coupling the first damper mass part and the second damper mass part for torque transmission, the coupling/damping means permitting a relative rotation of the first damper mass part and the second damper mass part relative to one another about the axis of rotation, the coupling/damping means being configured to have a first end region with a first coupling region that acts on the first damper mass part, and a second end region with a second coupling region that acts on the second damper mass part, so as to transmit torque between the first damper mass part and the second damper mass part, the damper mass parts being tiltable relative to one another at least in one area, the coupling/damping means being rotatably arranged by one of its end regions at one of the damper mass parts and having, in its other end region, a pin-shaped projection which engages in an elongated recess formed in the other damper mass part, the elongated recess being one of substantially U-shaped and V-shaped, a vertex region of the recess being radially outside of free ends of legs of the recess, in a basic rotational position, a region of the rotatable support of one end region of the coupling-damping means at one damper mass part lies substantially radially between the vertex region of the recess and the axis of rotation.

* * * * *